United States Patent
Hodge et al.

(10) Patent No.: US 9,866,683 B1
(45) Date of Patent: *Jan. 9, 2018

(54) UTILIZING SIP MESSAGES TO DETERMINE THE STATUS OF A REMOTE TERMINAL IN VOIP COMMUNICATION SYSTEMS

(71) Applicant: **GLOBAL TEL*LINK CORP.**, Reston, VA (US)

(72) Inventors: Stephen Hodge, Dallas, TX (US); Eric Gonzalez, Highland Village, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,823

(22) Filed: Mar. 13, 2017

Related U.S. Application Data

(63) Continuation of application No. 15/360,847, filed on Nov. 23, 2016, now Pat. No. 9,614,974.

(51) Int. Cl.
| | | |
|---|---|---|
| *H04M 3/00* | (2006.01) |
| *H04M 3/22* | (2006.01) |
| *H04M 7/00* | (2006.01) |
| *H04L 29/06* | (2006.01) |
| *H04L 29/12* | (2006.01) |
| *H04M 3/42* | (2006.01) |
| *H04M 3/56* | (2006.01) |

(52) U.S. Cl.
CPC ...... *H04M 3/2281* (2013.01); *H04L 61/3085* (2013.01); *H04L 65/1006* (2013.01); *H04L 65/608* (2013.01); *H04M 3/42102* (2013.01); *H04M 7/0078* (2013.01); *H04M 3/56* (2013.01)

(58) Field of Classification Search
CPC .......... H04M 3/2281; H04M 3/42102; H04M 7/0078; H04M 3/56; H04L 61/3085; H04L 65/1006; H04L 65/608
USPC .................. 379/188, 200, 249; 370/259, 352
See application file for complete search history.

(56) References Cited

U.S. PATENT DOCUMENTS

| 6,064,963 A | 5/2000 | Gainsboro |
| 7,106,843 B1 | 9/2006 | Gainsboro et al. |

(Continued)

OTHER PUBLICATIONS

RFC 3515.*

(Continued)

*Primary Examiner* — Quynh Nguyen
(74) *Attorney, Agent, or Firm* — Sterne, Kessler, Goldstein & Fox P.L.L.C.

(57) ABSTRACT

There is a growing problem in correctional facility telecommunications systems in which parties on a voice call may connect inmate callers with restricted parties. Prison communication systems monitor calls to prevent such activity, but in Voice over Internet Protocol (VoIP) environments such systems may fail to detect this activity. The present disclosure provides details of a system and method for using SIP messages common in VoIP environments to detect illicit activity initiated by a party on a voice call within a controlled environment. Scenarios are detected in which a called party connects an inmate caller to a restricted party via three-way call conferencing, call forwarding, or other call features. Corrective actions are then taken when such activity is detected, such as call blocking or alerting officials illicit activity is occurring.

30 Claims, 18 Drawing Sheets

(56) References Cited

U.S. PATENT DOCUMENTS

| | | | |
|---|---|---|---|
| 7,426,265 B2 | 9/2008 | Chen et al. | |
| 7,916,845 B2 * | 3/2011 | Rae | H04M 7/006 379/188 |
| 7,961,858 B2 * | 6/2011 | Polozola | G06Q 20/04 379/114.2 |
| 8,031,849 B1 | 10/2011 | Apple et al. | |
| 8,054,960 B1 | 11/2011 | Gunasekara | |
| 8,869,275 B2 * | 10/2014 | Zhao | H04L 29/06 726/22 |
| 8,953,583 B2 * | 2/2015 | Swaminathan | H04L 65/1069 370/259 |
| 8,953,758 B2 | 2/2015 | Kumar | |
| 9,031,057 B2 * | 5/2015 | Long | H04L 65/1063 370/261 |
| 9,253,439 B2 * | 2/2016 | Andrada | H04N 7/148 |
| 9,614,974 B1 | 4/2017 | Hodge et al. | |
| 2007/0011235 A1 * | 1/2007 | Mutikainen | H04L 12/581 709/204 |
| 2012/0069983 A1 | 3/2012 | Sall | |
| 2013/0007293 A1 | 1/2013 | Den Hartog et al. | |

OTHER PUBLICATIONS

List of SIP Response codes.*
International Search Report and Written Opinion directed to related International Patent Application No. PCT/US17/19723, dated Mar. 23, 2017; 8 pages.
Notice of Allowance directed to related U.S. Appl. No. 15/360,847, dated Jan. 19, 2017; 15 pages.
Rosenberg, et al., "SIP: Session Initiation Protocol," Standards Track, RFC 3261, Jun. 2002, pp. 1-269.
Johnston et al., "Session Initiation Protocol Services Examples," Best Current Practice, RFC 5359, Oct. 2008, pp. 1-170.

* cited by examiner

UTILIZING SIP MESSAGES TO DETERMINE THE STATUS OF A REMOTE TERMINAL IN VOIP COMMUNICATION SYSTEMS

CROSS-REFERENCE TO RELATED APPLICATIONS

This application is a continuation of U.S. patent application Ser. No. 15/360,847 filed on Nov. 23, 2016, which is incorporated by reference herein in its entirety.

FIELD

The disclosure relates to communication systems for controlled-environment facilities and detection of fraudulent telephone activity between an inmate and a called party in a Voice over Internet Protocol (VoIP) environment.

BACKGROUND

Controlled-environment communication systems are telecommunication systems designed to enable members within a controlled-environment facility to communicate with parties outside of that facility. These systems allow telecommunications activities for the populations of those facilities to be highly regulated. They are designed with security measures and apparatus that enable administrators of such facilities to set policies for allowed and disallowed activity, monitor voice calls to detect members within the facility engaging in disallowed activities, and also to bill parties on the call as appropriate. These systems are designed for many contexts in which monitoring of telecommunications activity is desirable, such as health facilities, military facilities, and correctional facilities such as prisons.

The prison application has an especially urgent need for strong security measures and apparatus. Prison inmate communication is highly circumscribed because of the potential for abuse. Inmates have been known to use inmate communication systems in the past to engage in illicit activity outside of the prison, threaten parties of interest such as judges and attorneys, and witnesses, and communicate with inmates in other prison facilities about possibly illegal activity. As such, several security measures have been developed for use with these systems over the past two decades which have now become standard. Combinations of several features such as personal identification number (PIN) entry, biometric validation of inmates including fingerprint and voice print identification, per inmate allowed and disallowed contact lists, physical phone enclosures, and so on are all common features in several prison communication systems on offer. These features allow call requests by inmates to be validated such that only valid requests, such as an inmate requesting a call to a family member evaluated as a non-threat, are allowed at the onset of the call request.

However, these security features have struggled to keep up with schemes to circumvent them. For example, within the facility itself, an inmate may coerce another inmate into initiating a phone call to an outside party that appears on that inmate's block list, but not on the block list of the coerced party. An inmate may then converse with the outside party, evading detection by security features by simply posing as another inmate.

A common (and more subtle) class of circumvention attempt involves the assistance of a called party that is allowed by the prison system. An allowed called party can be contacted without alerting any security alarms by the prison communication security apparatus, and the called party may assist the inmate in contacting a third party for nefarious purposes using features commonly available to public telephone network customers. Three-way calling is a prime example: an allowed called party can establish a three-way call with a third party, which then allows the inmate and the third party to communicate using a call session originally established between the inmate and the allowed called party. Thus, contact between the inmate and the undesirable third party evades detection by the prison security apparatus.

In response, several schemes have been developed to detect three-way calling attempts. Several techniques fall under the umbrella of "sound detection," in which sounds associated with three-way call activity are detected. One such method is the detection of a loud "clicking" sound called a "hookflash," "switchhook," or "flashhook" that is made when a called party switches to a different line to initiate a call session with a third party. To detect this sound, the energy of the call audio is used to detect a short burst of energy over the call session that exceeds a threshold. Another common scheme infers a three-way call attempt by detecting an extended period of silence. This detection scheme is based on the observation that the called party leaves the call session with the inmate for some period of time to initiate a call session with a third party, and thus the inmate call session may be silent for some amount of time.

Yet another scheme compares the silence during a known period of conversation with other silence periods, based on the observation that the background noise characteristics of silence made by a central office, as is the case when a called party has left the session to contact another party, is fundamentally different than the background noise made when the called party is present. In yet another iteration of the competition between inmates and prison telecommunication system designers, several detection schemes now exist to detect inmates' attempts to mask the silence or hookflash sound associated with three way calling by creating a loud sustained noise on the call line, for example, by blowing into the receiver. Echo characteristic detection is yet another technique to detect potential three-way calling, based on the observation that there is a "characteristic echo" caused by the natural electromagnetic reflection caused by the interfacing between common telephone switches and telephone line materials. When the echo characteristic changes, this may be indicative of a third party being added to the call which has added yet another echo to the call. Combinations of techniques also exist in the art, such as detecting the hookflash click and a silence immediately following the click.

All of these techniques achieve varying levels of success, and reducing false-positive detections are a key challenge for all of them. Furthermore, most of these methods are only applicable when inmates and called parties are served through legacy Public Switched Telephone Network (PSTN) technologies such as analog "plain old telephony service" (POTS) or Integrated Services Digital Network (ISDN) technologies. As voice communication shifts towards Voice over Internet Protocol (VOIP), many of these techniques have become obsolete. VoIP operates on a "packet-switch" paradigm, in which packets representing samples of encoded voice are sent between speakers on a voice call, where, unlike the "circuit-switched" paradigm used in PSTN, packets do not require a dedicated line to be established for the entire path between the call parties. VoIP signaling comprises two distinct streams, voice data which carries packetized digitally-encoded voice between call parties, and signal data that carries signaling message packets that enable call session initiation, routing, session parameter negotiation between call parties, and teardown of a VoIP call.

In particular, techniques designed to reduce bandwidth usage of VoIP calls have created challenges for legacy three-way call detection techniques. Silence suppression, in which a phone terminal serving a user who is not speaking does not generate voice data to send to the other call party, poses significant problems for existing detection schemes, as loud clicking sounds from hookflash may be missed or not generated at all, and background noise without speech present often results in no sound packets being sent between users. The digitization of voice also allows for better fidelity of the sound generated at the speaker end to be reproduced at the receiver end, negating echo-based detection schemes significantly.

SUMMARY

The invention of the present disclosure seeks to address the problems introduced by VoIP in detecting called-party assisted illicit activity. In particular, the present disclosure devises a system and algorithms to exploit the Session Initiation Protocol (SIP) signaling that is commonly used in VoIP technologies to detect such activity. The invention utilizes SIP signaling to detect abnormal and disallowed activity in a fashion that is not wholly dependent on sound detection techniques, can provide additional information about the activity which may not have been available in the past such as information about the third party, and also expands the detection to several other forms of called-party-assisted illicit activity, such as call forwarding, call redirect, call conferencing, and call transfer.

The invention of the present disclosure introduces a call processing system which contains a "monitoring and detection" module that can perform packet-sniffing on both VoIP voice data packets and SIP signaling packets to detect attempts by the called party to circumvent prison telecommunication security by initiating contact with a third party. The call processing system may also be referred to as an inmate telecommunication system (ITS) or an inmate calling system (ICS). In the exemplary embodiment, the system connects a VoIP-capable inmate caller, either due to a VoIP-capable terminal housed inside the prison facility or from a line interface with the ability to translate legacy inmate terminal signals to VoIP-compatible signals, and a VoIP-capable called party outside of the prison facility, in what is called a "VoIP-to-VoIP" scenario. In particular, the system delineates the call into two phases, the "call setup" phase and the "call established phase," and depending on this phase, runs different detection algorithms to detect illicit activity based on received SIP messages. Based on SIP message type and content, various detections can be made, and additional information can be gathered about third parties that has not been available in sound-based detection schemes.

In other embodiments, the present invention also connects a VoIP-capable inmate caller to a legacy PSTN called party outside the prison facility. The system includes a VoIP gateway capable of translating the signaling messages associated with the PSTN into SIP signaling recognizable by the inmate calling terminal. This same SIP signaling can be used to detect called-party-assisted illicit activity in a similar fashion to the VoIP-to-VoIP scenario.

The call processing system includes administrative workstations that are used by the prison facility or investigators associated with the prison facility to live monitor calls and allow prison facility administrators to set policies for how infractions are to be treated by the system. When abnormal activity is detected, logs of both suspected infractions of telephone activity ("suspected infractions") and infractions that are confirmed to be disallowed ("confirmed infractions") are immediately sent to the administrative workstations, at which point corrective actions can be taken in real-time such as increased monitoring, pre-recorded warnings, call disconnection, or informing of law enforcement.

The system also maintains access with a Jail Management Server (JMS) which houses telephone and in-house behavior histories, telephone privilege policies, corrective action policies, and allowed and/or disallowed called party lists for every inmate in a prison facility. This server is also sometimes referred to as an offender management server (OMS). When abnormal activity is detected, logs of both suspected infractions and confirmed infractions may be sent to the JMS for long-term storage. Based on the history of an inmate and the called party, a threat level is assigned which determines the level of monitoring and severity of corrective actions taken for different telecommunication infractions. Inmate histories are made available in real-time to the call processing system to allow for adaptive corrective actions based on the behavioral history of the parties on a call.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
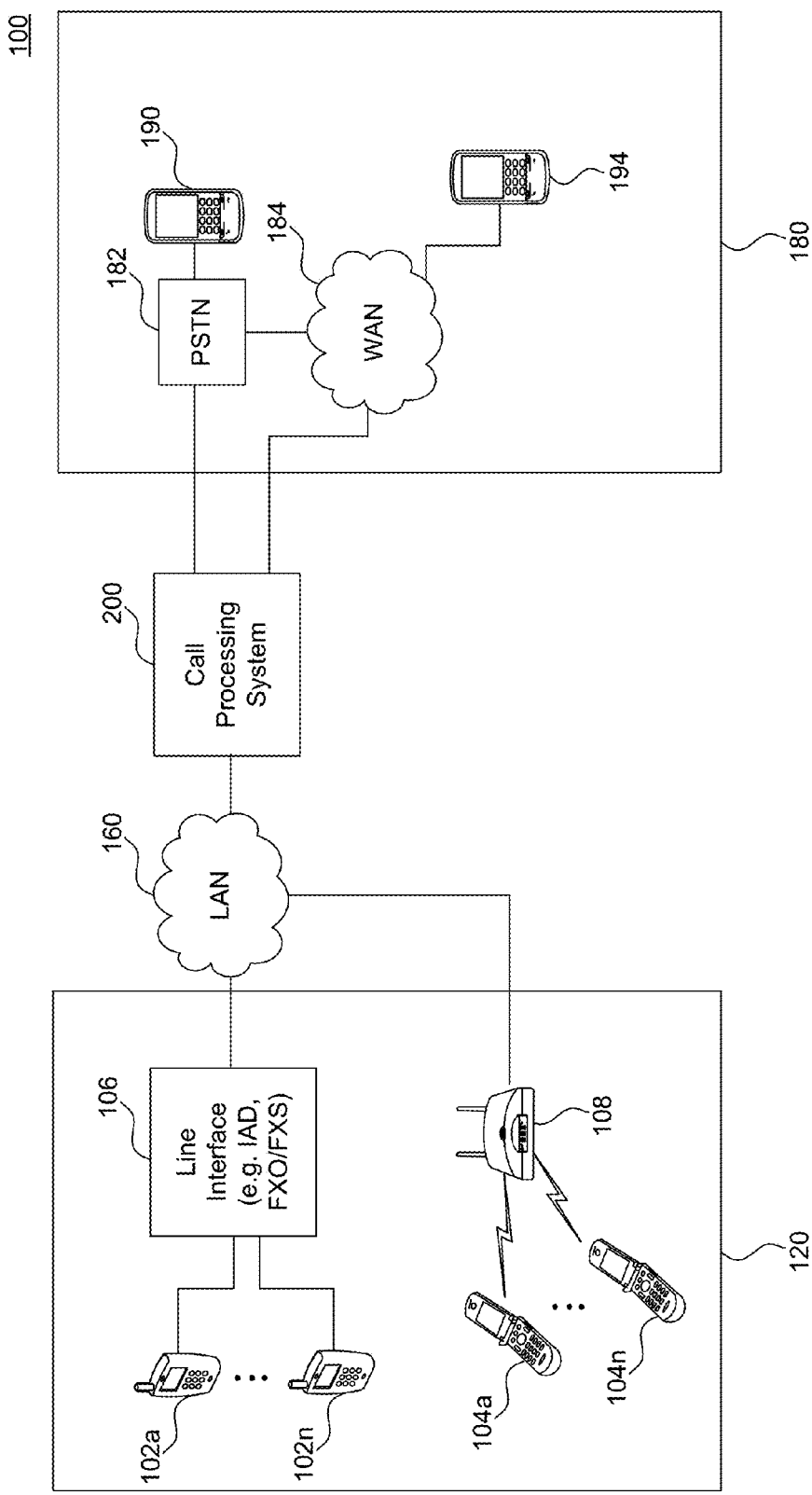
FIG. 1 illustrates a block diagram of a communication system, according to exemplary embodiments of the present disclosure.

Table 1 illustrates several SIP request message types, according to exemplary embodiments of the present disclosure.

Table 2 illustrates several SIP response message types, according to exemplary embodiments of the present disclosure.

Table 3 illustrates the content of SIP request and response messages, according to exemplary embodiments of the present disclosure.

The present disclosure will be described with reference to the accompanying drawings. In the drawings, like reference numbers indicate identical or functionally similar modules.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following detailed description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Communication System

FIG. 1 depicts a functional diagram of a prison communication system 100 according to exemplary embodiments of the present disclosure. The communication system comprises a prison facility 120, a local area network (LAN) 160, call processing system 200, and connects to a public telephone network 180. The call processing system is also referred to as an inmate telecommunication system (ITS) or an inmate calling system (ICS). Within the prison facility 120, multiple landline terminals 102a-n are connected to a line interface 106. These phones may be Voice over Internet Protocol (VoIP) phones, in which case the interface is essentially a packet router which routes VoIP data and Session Initiation Protocol (SIP) messaging packets through the LAN 160 and to call processing system 200. If the phones are traditional phone lines, for example analog "plain old telephony service" (POTS) or integrated services digital network (ISDN) lines, the interface 106 may be an integrated access device (IAD), which performs digital encoding and packetization of voice to be routed through the LAN 160.

The interface 106 may exist in several configurations. In cases where the terminals 102a-n are VoIP-capable phones, the IAD may simply serve to aggregate all packetized voice and signaling data to be transported across a single access link to the LAN 160. In cases where the terminals act on legacy phone technologies such as analog or ISDN lines, the interface may perform Foreign Office Station (FXS) and Foreign Exchange Office (FXO) functionality along with VoIP gateway functionality. The FXS/FXO functionality, paired together, allows for the interworking between legacy telephone signals, such as POTS or ISDN, and a VoIP network. In such cases, the signal between the line interface 106 and the LAN would be VoIP packetized voice and signaling, and VoIP voice and signaling data routed to the inmate terminals 102a-n would be translated by interface 106 to legacy telephone signals compatible with the inmate terminals.

Wireless terminals 104a-n may also be available to inmates to perform voice calls. These calls will be routed through a wireless access point 108, which will route all voice packets to LAN 160. Typically these wireless terminals will be VoIP-capable lines, such that any voice data is transmitted as digitally-encoded packetized data, but in cases where they are not, either the access point 108 or elements in LAN 160 may be capable of translating the signaling to VoIP. The wireless access point 108 may be an access point operating on a common wireless standard such as IEEE 802.11, or a commercially available base station operating on 3G or 4G standards such as Universal Mobile Telecommunication System (UMTS), Global System for Mobile Communications (GSM), Long-term Evolution (LTE), etc. The base station could be a "small-cell" or "femtocell" technology similar to a commercially available base station meant to cover smaller or confined areas. In any case, security parameters and settings available with the equipment allow secure transmission of voice and other data to the LAN 160.

In many embodiments, the terminals 102a-n and 104a-n may be equipped with security measures that serve as early validation prior to initiating a voice call. To use the terminal, for example, an inmate may need to enter a personal identification number (PIN) before being allowed to input anything related to contacting an outside party. The terminals may be equipped with biometric sensor data that can verify a voice print (e.g. an inmate speaking their name into the phone), a fingerprint scanner, and other features. The terminals may also be encased within an enclosure, such as a security cage around the terminal itself or a secure room which requires certain permissions to access, perhaps being guarded by live security as well as being subject to all manner of code entry and automatic scanning techniques. These features serve as a first line of defense against fraudulent activity.

The LAN 160 routes voice data between the prison facility and the call processing system 200. The LAN is comprised of switches and routers common in typical data networks. These devices may be privately owned and operated by the prison facility, prison authority in control of multiple facilities, or a service provider serving several prison facilities, or it may be part of the public internet.

The call processing system 200 contains the essential functions for routing calling parties within the prison facility 120 and outside parties connected to public telephone networks. In the exemplary embodiment, the call processing system is located remotely from the prison facility, and has the computing resources perform call processing for multiple prison facilities. However, in some embodiments a call processing system may be placed within a prison facility. The call processing system, following the appropriate validation and control steps, then routes calls to the public telephone network 180, and more specifically to PSTN 182 or a wide area network (WAN) 184 as appropriate. A called terminal 190 or 194 then receives the voice call. For called terminal 194, the phone will be reached directly through WAN 184. The terminal 194 is VoIP-capable, and thus receives and sends VoIP signaling (i.e. packetized voice and signaling messages).

In the case of the called terminal 190, routing may be determined by the call processing system itself or within the WAN 184 by an E.164 Number to URI Mapping (ENUM) server, which maps between SIP Universal Resource Identifier (URI) and PSTN-compatible telephone numbers. In the former case, the call processing system will connect directly with PSTN 182. In the latter case, the VoIP signal will be translated to a PSTN-compatible voice signal through a Media Gateway (MG) using Media Gateway Control Protocol (MGCP) and a signaling gateway that translates SIP signaling to PSTN-compatible signaling to interface between VoIP and PSTN networks. In such cases, the call processing system both sends and receives VoIP data and SIP messaging packets, while the conversion of VoIP and SIP signaling is handled by the elements within the WAN and is transparent to the prison system.

Call Processing System

Figure 2:
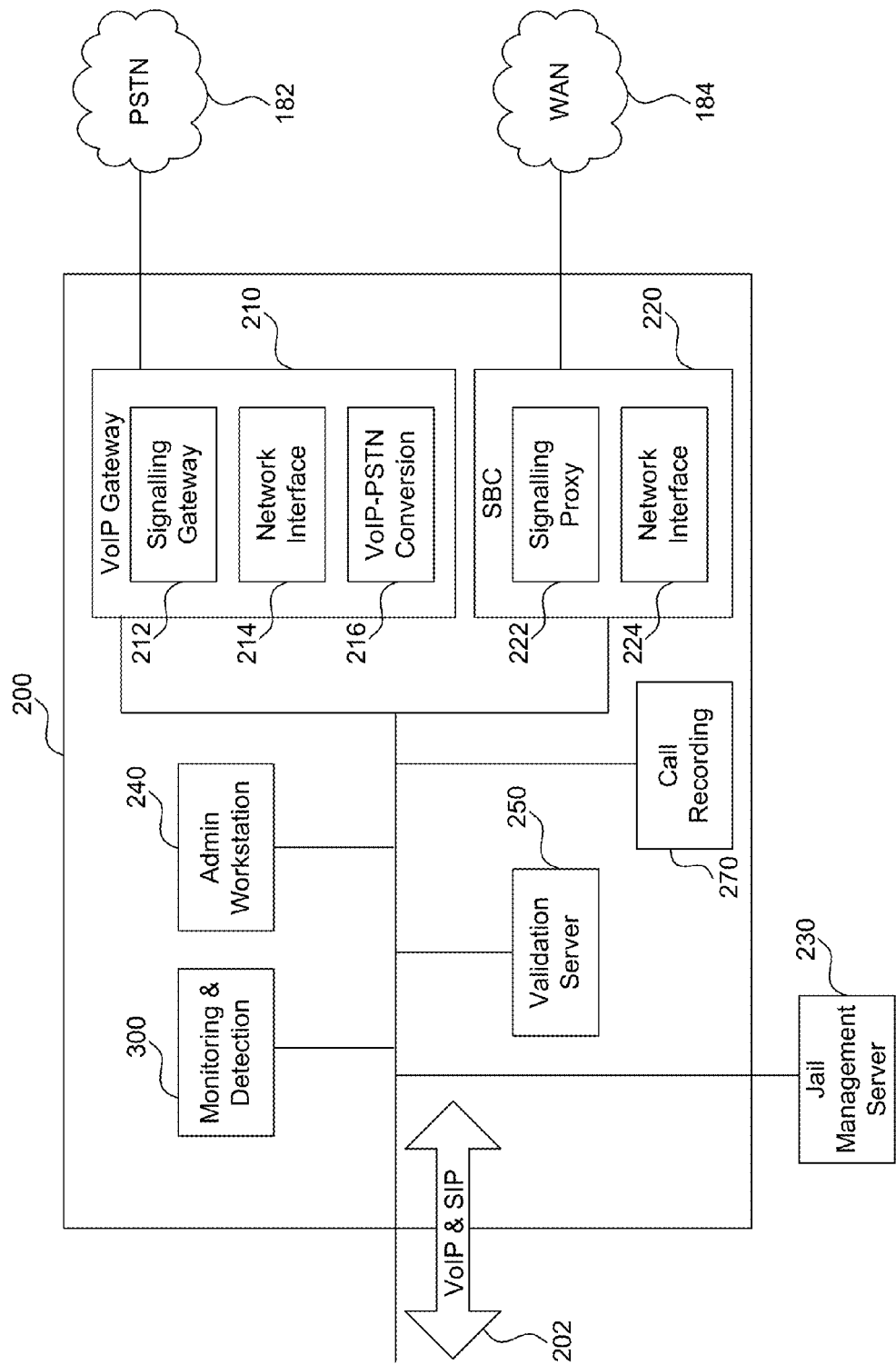
FIG. 2 illustrates a block diagram of a call processing system, according to exemplary embodiments of the present disclosure.

FIG. 2 depicts the call processing system 200 as shown in FIG. 1 according to exemplary embodiments of the present invention. The call processing system includes a session border controller (SBC) 220, VoIP gateway (VoIP GW) 210, a monitoring and detection (M&D) module 300, call validation server 250, administrative workstation 240, and call recording unit 270. The call processing system also has a persistent connection to a jail management server (JMS) 230 which is typically located offsite, but may also be included in the call processing system itself depending on the prison facility's administrative needs. These modules handle the processing, validation, routing, and monitoring of voice calls, as well as any actions taken in response to confirmed infractions. Those skilled in the art will appreciate that the specific embodiment disclosed is not limiting to the placement of essential functions, such that they may be placed at varying points in the overall system 100. The call processing system itself may be centralized such that it handles calls from multiple prison facilities, or may be located on-site at a prison facility based on various design factors. Functions may be split between a centralized call processing system 200, the prison facility 120, and the LAN 160 as appropriate.

The VoIP signaling 202 that is sent between the prison facility and the call processing system contains the two data streams, voice data and SIP messaging, as described above. Both streams are transmitted as packetized data, where SIP is transmitted using a reliable transport protocol such as TCP/IP. SIP signaling requires reliable transport because of its importance in governing the routing and communication between the call end points. The voice data is packetized and transported using the Real-time Transport Protocol (RTP). RTP is a well-known protocol specifically designed for transporting streaming data such as voice and video. RTP is designed to be delay-sensitive due to the nature of streaming data, and loss-tolerant to help satisfy the delay sensitivity.

The SBC 220 can consist of any number of servers, and acts as a point of contact between the prison communication system, including the call processing system and the prison facility (or multiple prison facilities), and the public telephone network 180. The SBC acts to control a call session between the inmate calling party and outside calling party. The SBC comprises two functional modules, the signaling proxy 222 and the network interface 224. The signaling proxy 222 is responsible for receiving SIP signaling from the inmate and outside call parties, and performing any signal translation or field replacement as necessary. The network interface 224 is responsible for routing packets to and from the processing facility, routing both the SIP and RTP packets to WAN 184 and receiving them from the WAN and routing back to LAN 160 for delivery to the inmate terminals. The SBC 220 also routes packets to the various modules within the call processing system 200 as appropriate for security and recording purposes, and can gather statistics on various performance metrics for all of its handled call sessions.

In some embodiments, a VoIP Gateway 210 may also be present to interface directly with a PSTN network 182. This gateway provides the interworking functionality that is also provided in the WAN 184 by way of the MG and MGCP. Therefore, the VoIP gateway acts as a "translator" between VoIP signaling, including the voice data (RTP) packets and the SIP messaging packets, and PSTN-compatible signaling, including the circuit-switched sound through an Integrated Services Digital Network (ISDN) and control signaling such as Signaling System 7 (SS7) ISDN Signaling User Part (ISUP) signaling. To enable that translation, the VoIP gateway contains a signaling gateway 212, a network interface 214, and VoIP-PSTN conversion module 216. The signaling gateway provides the signaling translation between SIP and SS7 ISUP signaling messages, the VoIP-PSTN conversion module provides the translation between VoIP RTP and PSTN circuit-switched sound, and the network interface provides the hardware to allow the gateway to interface with both a data network via LAN 160 and a PSTN 182. Thus, the VoIP gateway allows the call processing system 200 to still transmit and receive VoIP signaling 202 to and from the prison facility 120.

The jail management server (JMS) 230, often referred to as an offender management server (OMS), can consist of one or many servers, and hosts a database that stores broad information on inmates and outside called parties regarding behavioral history. The JMS is maintained by the prison facility administration, and in various embodiments may be located on-site at the prison facility, within the call processing system or in a remote location. The behavioral history will contain information regarding an inmate's past infractions within the prison itself (e.g. altercations with other inmates) and also infractions related to telephone behavior. The JMS maintains class of service information that specifies the parties that each inmate is allowed to call ("allowed lists") and/or the parties it is not allowed to call ("block lists"), which outside parties have special allowances to perform certain activities such as three-way calling or call-forwarding (e.g., an attorney may have special privileges to conference in a third party), allowed call durations, etc. Similar information is kept on called parties outside of the prison. The JMS also serves as a repository that the other call processing system modules may refer to when performing security-related functions. In particular, the administrative workstation 240 may receive data about inmates to create policies for corrective action when inmates engage in illicit behavior.

In some embodiments, the JMS may keep logs of both suspected infractions and confirmed infractions, i.e. suspected infractions that have been confirmed to be disallowed for that inmate. The monitoring and detection (M&D) center 300 may, for example, detect a suspected three-way call attempt for an inmate and send a log of the attempt including a timestamp, called party, call duration, and other information to the database to be stored for reference. Later, when the M&D module 300 confirms that this potential three-way call attempt is a definite, disallowed three-way call attempt, another log of the disallowed three-way call attempt will be sent to the JMS, including similar information. Based on all of this information, the JMS also keeps and updates a "threat level" for each inmate, and keeps and updates policies for corrective action for each inmate according to their threat level.

The validation server 250 handles the validation steps required before a call is initiated with the public telephone network. The server may work in conjunction with data sent from the terminals related to biometric validation, keeping a database of thumbprint and voice print samples to check against the identity of the inmate. The server may handle the PIN input by the inmate. The server will also check if the intended called party is allowable for that specific inmate by checking against data contained in the JMS. After the validation server has performed these validation steps, the call is allowed by the SBC 220.

The administrative workstation 240 is a set of terminals which may be used by prison security personnel to perform real-time corrective actions when illicit activity is detected in a phone call. These actions may include automated actions such as disconnecting a call, issuing a pre-recorded warning on the call, informing law enforcement, or live monitoring the call. If a call is flagged as a potential three-way call or a forwarded call, a guard or other official may listen to that call and issue a warning, disconnect the call, or otherwise flag the call for further scrutiny.

The administrative workstations receive information about inmate histories from the JMS, and may also be used by prison facility personnel to make live changes to the JMS, including making changes to the class of service lists, adding, removing or otherwise flagging allowed called party numbers for a particular inmate, and logging additional infractions into the behavior history data. Information such as allowed or block lists which are stored in the JMS may be sent from the JMS to the administrative workstations so that the workstations can set corrective action policies when inmates communicate with disallowed call parties. The behavior history data may be stored locally within the administrative workstations to be used as input when setting corrective action policies for an inmate's calls.

The M&D module 300 may contain one or many servers, and is designed to perform automated call monitoring, suspected infraction detection, and corrective actions for each call, including the use of SIP signaling as in exemplary embodiments of the present invention. M&D receives all data associated with a VoIP call, including the voice data (RTP) and the SIP signaling packets, to perform detections as required. M&D keeps information of the encoding and decoding (codec) schemes of a particular call and is capable of decoding all RTP packets to perform common methods for detecting illicit activity. Therefore, voice data packets can be decoded into sound so that sound-dependent techniques such as voice recognition, silence detection, hook-flash detection, and continuous noise detection can be performed on the sounds as in existing three-way calling detection methods.

Figure 3A:
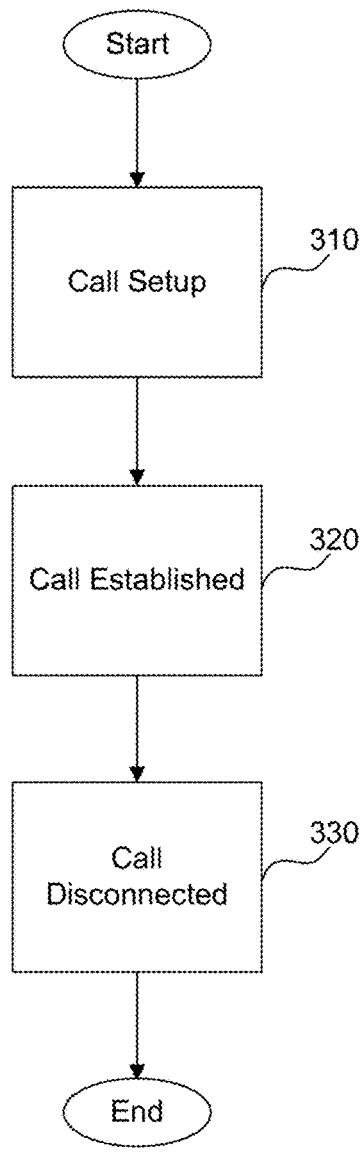
FIG. 3A illustrates a diagram of the call phases of a voice call, according to exemplary embodiments of the present disclosure.

M&D 300 is also capable of decoding SIP signaling for a particular voice call and performing the detection of suspected and confirmed infractions using those signals. The M&D maintains a state machine for each individual call based on SIP signaling, which it uses to infer the call status. FIG. 3A depicts that state machine. As can be seen in FIG. 3A, at the start of the call, there is a call setup phase 310 which progresses to a call established phase 320, and finally a call disconnected phase 330. Each of these phases can be inferred from the progression of SIP messages being received by the SBC. In exemplary embodiments, the SIP signaling packets are received by a terminal 102*a-n* and 104*a-n*, the SBC, or both. The detection of suspected infractions is based on SIP signaling is dependent on the phase in which a particular signal is received, as some SIP messages have multiple uses depending on when they are received in the call progression.

Figure 3B:
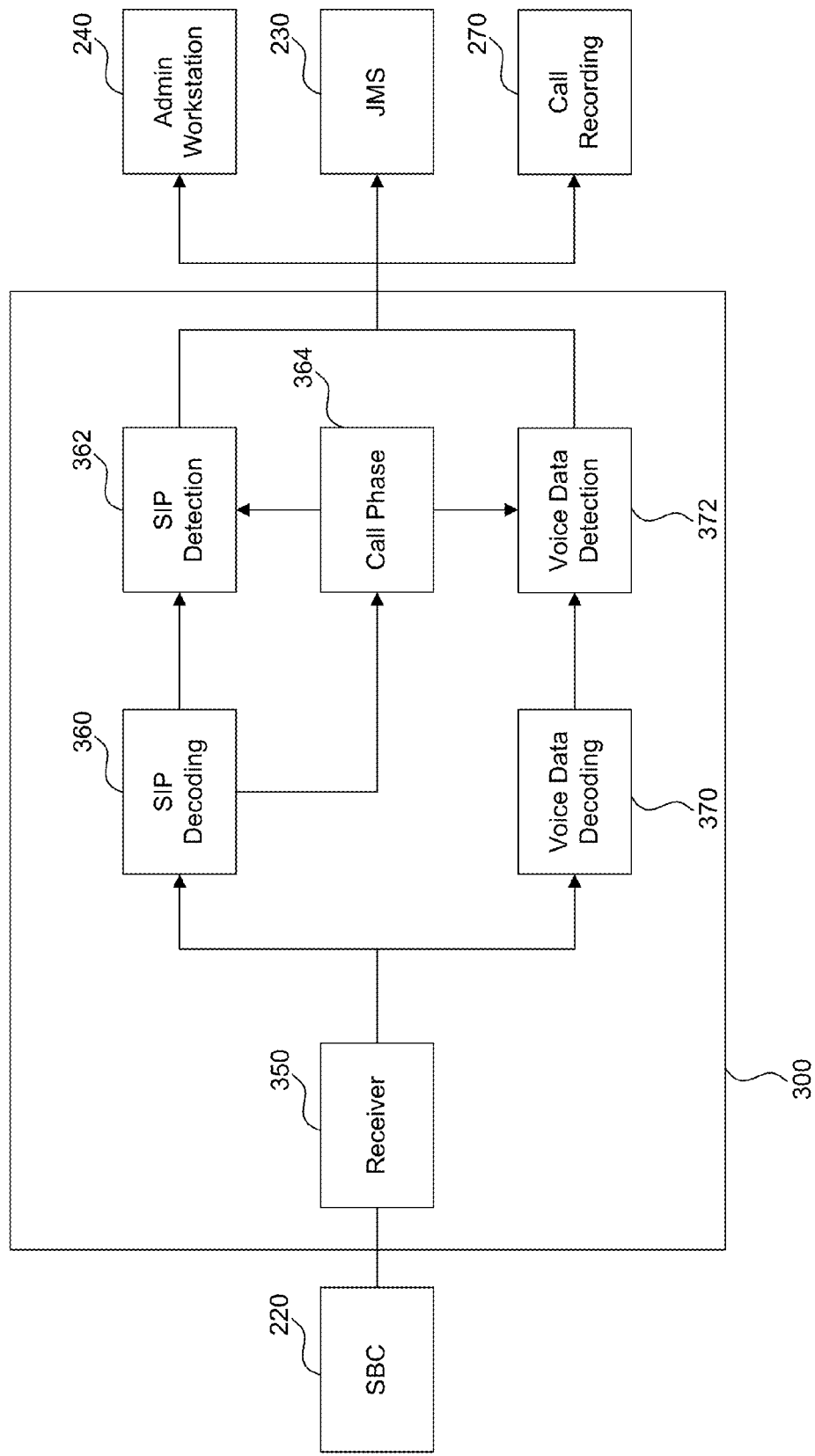
FIG. 3B illustrates a block diagram of the Monitoring and Detection module, according to exemplary embodiments of the present disclosure.

FIG. 3B depicts the exemplary embodiment of the M&D module 300 as seen in FIG. 2. The M&D 300 includes a receiver 350 that receives packets associated with a call session, both SIP messaging and RTP, from the SBC 220 and the VoIP GW 210. The receiver 350 splits its received packets into SIP and RTP packets and forwards them to the SIP and voice data decoding modules 360 and 370 respectively. The call phase module 364 stores the call phase flag of the call between "call setup" and "call established" as described in FIG. 3A. The SIP Detection module 362 and Voice Data Detection module 372 are responsible for detecting suspected infractions from SIP and voice data streams, respectively, and confirming that the infraction is disallowed. These modules are described with greater detail below.

SIP Signaling and the Session Description Protocol (SDP)

A brief discussion of SIP signaling and the Session Description Protocol (SDP) is provided focusing on the information necessary for detecting infractions in exemplary embodiments of the present invention. Users are identified by SIP-URIs, which bear a format similar to an email address, e.g. "SIP: 12095559999@voip-service-provider.net" or "SIP: Nathan.Frank@voip-service-provider.net." The SIP-URI may also be in the form of a telephone URI (tel-URI), which has the format "tel: +12095559999" for connecting to a user connected through a PSTN. In embodiments, these SIP-URIs can be used in addition to traditional phone numbers as part of allowed and block lists in the JMS to prevent inmates from contacting prohibited parties.

SIP signaling is composed of two broad message types called "requests" and "responses." During call setup, call disconnect, and established call phases, SIP requests and responses are sent between the two call parties to negotiate the parameters of a call session. The SIP requests contain messages for initiating certain behaviors between the end users, while SIP responses are messages that are sent in response to request messages. A SIP request sent from a user generally requires that a SIP response message be returned to that user containing info about the request handling. Some of the most common SIP request message types are the following:

TABLE 1

Common SIP Request Messages

| SIP Request | Use |
|---|---|
| INVITE | Used for the initial session setup request and negotiation of media and codec changes between the call endpoints |
| ACK | Confirms INVITE request |
| BYE | Initiates the end of a session |
| REGISTER | Communicates user location to proxy servers to assist in locating the user when a call is attempted |
| OPTIONS | Request from sender to ask receiver about its capabilities, including which methods it supports |
| REFER | Refers the recipient to begin transfer their call to another party (call transfer) |
| NOTIFY | Notifies the subscriber of a new event |

SIP response message types are signified by numeric labels 100-699 that generally refer to specific events at the receiver. The response numbers correspond to "reason phrases" that bear have no functional use but allow for human understanding. The ranges, divided into groups of 100, refer broadly to different types of responses:

1xx: Informational
2xx: Success
3xx: Redirection
4xx: Client error
5xx: Server error
6xx: Global failure Table 1 shows several of the most common SIP response messages, their reason phrases, and their common use:

TABLE 2

Common SIP Response Messages

| SIP Response | Reason Phrase | Use |
|---|---|---|
| 100 | Trying | A proxy server is attempting to contact the called party |
| 180 | Ringing | The called party has been reached but has not yet accepted the call |
| 200 | OK | The request recipient accepts the request |
| 181 | Call is Being Forwarded | The called party has forwarded the call request to another party |
| 302 | Moved Temporarily | The called party SIP-URI has been temporarily changed |

Figure 4:
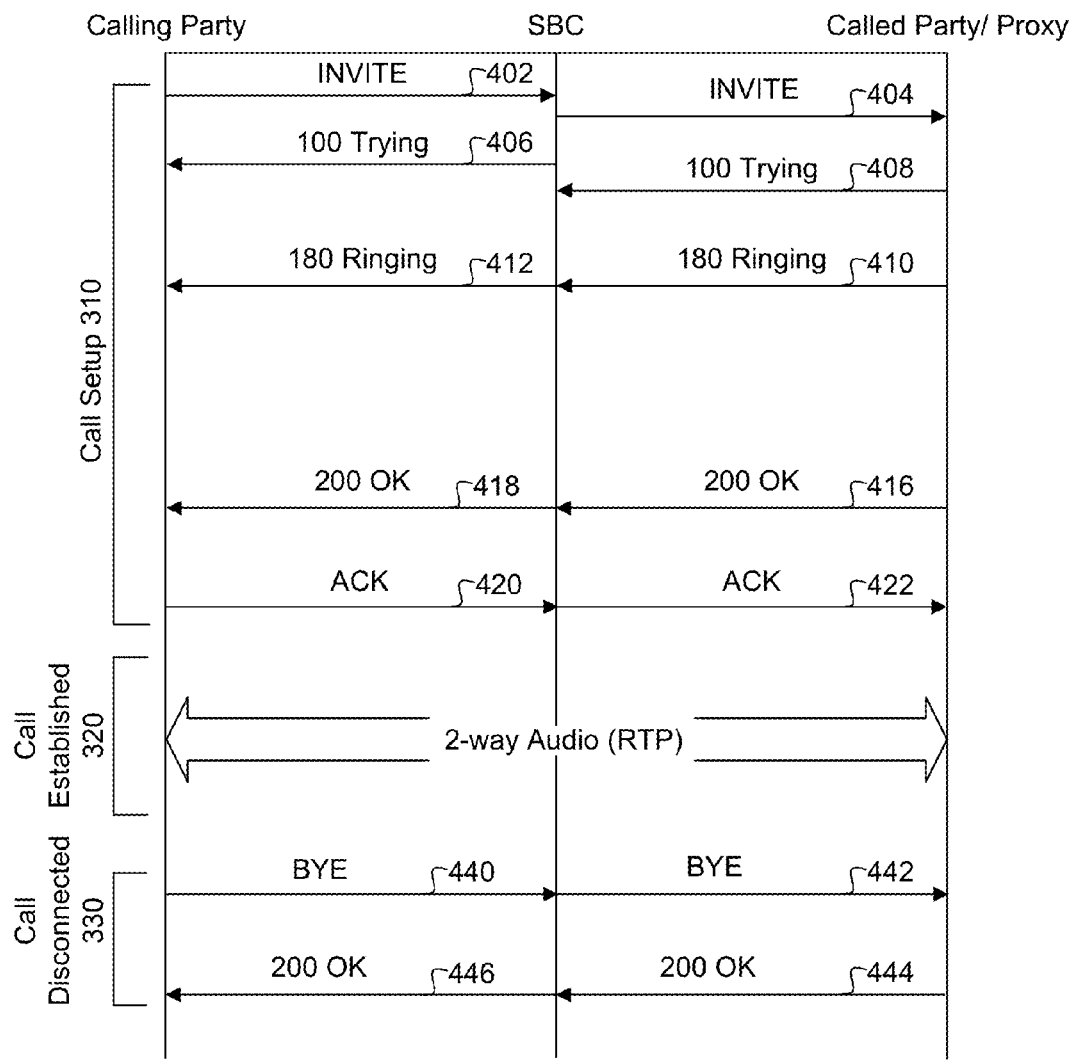
FIG. 4 illustrates a diagram of a signaling call flow for a voice call established between two VoIP-capable systems, according to exemplary embodiments of the present disclosure.

The time of arrival of a SIP request or message relative to the call phase as shown in FIG. 4, and the content of those messages, are used in the M&D module 300 to detect suspected infractions. Both SIP requests and responses follow a similar format, as follows:

TABLE 3

High-level description of SIP message content

| Information Type | Use |
|---|---|
| Request Line (SIP Request only) | Request Type (e.g. INVITE), Request Universal Resource Identifier (URI), SIP protocol version |
| Status Line (SIP Response only) | SIP protocol version, Response Type (e.g. 200), Response Type Reason Phrase ("OK") |
| Headers | Information about the request/response and the message body |
| Empty Line | An empty line |
| Message Body | Session Description Protocol (SDP) information, Miscellaneous information |

The SIP request line is the first line of a SIP request message that contains the request type (e.g., the SIP message types from Table 1), a Request URI, and the SIP protocol version. A Request URI is simply a SIP-URI for the intended recipient of the message. When a SIP request message containing a URI such as "SIP: John.Smith@voip-service-provider.net." is sent by a user, a "SIP server" that serves the domain "voip-service-provider.net," also referred to as a "SIP proxy server" or just "proxy server," will try to locate user "John. Smith" and deliver the SIP request message to them.

The SIP status line is the first line of the SIP response message. Because SIP response messages are sent in response to SIP requests, the SIP status line contains less information, including the SIP protocol version, Response Type (an integer from 100-699) and the reason phrase as shown in Table 2.

The SIP header section contains fields with pertinent information to the session, such as the calling party, called party, and call session identifier numbers. Among the most commonly used fields are the following:

From: Contains a SIP-URI for the initiator of the session

To: Contains a SIP-URI for the initiator of the session

Call ID: contains the SIP-URI of the user sending the message

CSeq: Contains an integer to order request sequences

Contact: Contains a SIP-URI that can be used to directly contact the user

Refer-to: Contains a SIP-URI of a third party for call transfer

Referred-by: Contains a SIP-URI of the party that initiates call transfer

The "from" and "to" fields contain SIP-URIs of the calling and called parties, respectively. The "Call ID" field contains a long identifier string that is used for all SIP request and response messages associated with a particular call session. The "CSeq" field will contain an integer and a SIP Request message type (e.g. INVITE, REFER). All messages with the same integer number in the field are messages that are associated with the original request. As an example, during a call setup, all messages associated with the call setup procedure will contain the same integer number in the "Cseq" field, and all SIP response messages will also contain "INVITE" in the field. In some embodiments this field can be used to determine the call phase of the call session, where all SIP messages associated with the call setup should have a "CSeq" with integer value of 1. The "contact" field contains a more specific SIP-URI for the user sending the message, which allows for direct contact with the user identified as opposed to the use of proxy servers to locate the user. Importantly, the information for the "contact" header field is only available after a called party is reached. Thus, SIP messages directed towards the calling party will not contain a "contact" header until the called party is found by a proxy server serving the called party's domain. Additionally, the "contact" header field may contain an additional string "isfocus" that signifies the potential that the user sending the message is attempting to initiate a conference-calling environment. "Refer-to" and "Referred-by" are headers that pertain to a call transfer attempt, where "Referred-by" contains the SIP-URI of the party that is initiating a call transfer, and "Refer-to" contains the third party that the call transfer is directed to.

The message body of a SIP message can contain additional pertinent information for the session, and typically includes at least a section of data following the Session Description Protocol (SDP) convention. SDP is a data format that specifies session level attributes as well as the encoding of data of any requested or active media streams. A typical entry of SDP information in a message may appear as below:

v=0
o=Nathan.Frank 2090844527 2090844528 IN IP4 voip-service-provider.net
s=
c=IN IP4 client.biloxi.example.com
t=0 0
m=audio 3456 RTP/AVP 0
a=rtpmap:0 PCMU/8000
a=sendonly SDP comprises several "types" that are signified by a single character, each of the types specifying a different aspect of a session or media stream that is active between calling and called parties. The "m=" and "a=" fields are particularly pertinent to embodiments of the current invention and are described in detail. Fields beginning "m=" are "media lines" which specify a stream of media to be sent between the two users. In general, users can have multiple streams between them, for example a media stream for audio and another stream for video such as in a video call. In such a case, there would exist two "m=" fields, one with "m=audio" and another with "m=video".

Immediately following an "m=" there may be one or more attribute fields, signified by "a=", which specify specific attributes of the media stream specified by the closest preceding "m=" media line. The attribute field is responsible for specifying the specific audio encoding for a media stream. For example, the "a=rtpmap:0 PCMU/8000" line specifies that the audio stream specified in the "m=audio" line is encoded using Pulse Code Modulation (PCM) µ-law and sampled at a rate of 8 KHz. Additional attribute fields may also be added to specify additional attributes of the media stream. For example, the "a=sendonly" field specifies that for that media stream, the user sending the SIP message containing the SDP information will only be sending data for that media stream at the encoding specified, and will not accept packets for that media stream.

SIP Message Flow Call Setup and Disconnect

FIG. 4 depicts call flow 400 of the SIP message flow for a call between an inmate in the prison facility and a called party outside of the prison facility according to exemplary embodiments of the present invention. The flow is limited to the nodes immediately connected to the SBC. As shown in FIG. 2, the signal received by the SBC from the inmate caller is a VoIP signal comprising voice data and SIP signaling 202. In one embodiment, the terminals 102*a*-*n* and 104*a*-*n* are VoIP-capable, and in another embodiment, translation has occurred in the network between the terminals and the SBC to convert analog voice to a VoIP signal. The signal received by the SBC from the public telephone network is also a VoIP signal, where either the called party 190 is a VoIP-capable terminal 194, or is a legacy telephone terminal 190 that is converted into VoIP signal by a Media Gateway (MG) in WAN 184. This embodiment shows the call flow for a call that would not flag any suspected infractions based on the received SIP signaling messages, although detections such as voice recognition and silence detection may still be detected through the monitoring of the voice data itself.

Messages 402 through 422 are part of the call setup phase 310 as seen in FIG. 4. The SIP request message INVITE 402 is the initial call setup request that comes from the inmate caller, where another INVITE 404 is then passed by the SBC to the outside calling party via WAN 184. The content of 404 is substantially similar to the content of 402, as the SBC acts to aggregate and control all sessions occurring with a party in the prison facility. In general, the SBC will send a forwarded form of a message received from the WAN to the inmate calling party and do the same in the other direction. The INVITE message will contain the "from", "to", "call id" and "cseq" headers as described previously. The INVITE message body will also contain SDP information specifying an audio stream with an "m" line and the codec with an "a" line as described previously, which will signal the requested media stream format parameters to the called party.

Immediately following the receipt of the INVITE by the SBC, and by a proxy server contained in the WAN 184, a "100 Trying" SIP response message 406 and 408 are sent back to the node sending INVITE messages 402 and 404. The purpose of this message is simply to inform the requesting node that the message has been received by the recipient node, and that the recipient node is attempting to serve that request. The 100 Trying message does not come from the called party, and thus, no new information about the called party is added at that point. At 410, a SIP "180 Ringing" signal, another SIP response message, is received by the SBC from the called party and forwarded to the calling party in message 412. This signal is sent by the WAN after the called party is reached and the INVITE message delivered, and the called party has not yet accepted the call session. The "Ringing" label is representative of a phone ringing in legacy systems prior to the user picking up the phone. In embodiments, the SIP 180 Ringing signal will typically parrot the header and SDP information received in the INVITE signal. The message will also include the "contact" header giving the direct SIP-URI of the called party, as the called party has been reached at that point in the flow, and the called party can add its direct SIP-URI into any message.

The "200 OK" SIP response message 416 and 418 are sent when the called party has accepted the call session. In response to receiving the 200 OK, the inmate calling party then sends a SIP request "ACK" message 420 and forwarded by the SBC at 422, that the 200 OK has been received by the inmate calling party. This message signifies the end of the call setup phase 310. All messages in the call setup phase 310 will have a "Cseq" header with the same integer value, which can be used in embodiments to track the call setup phase 310. Furthermore, the "Cseq" will also contain the string "INVITE" for all messages except the ACK messages, signifying the most recently exchanged SIP request message. The ACK message replaces the string "INVITE" with the string "ACK" in the "Cseq" header, as the ACK is the most recent SIP request message sent for the procedure, but the integer value remains unchanged. This embodiment also leaves out potential additional signaling that may renegotiate the initially requested audio stream parameters, if, for example, the called party is incapable of certain encoding rates. These renegotiations typically manifest in the form of additional INVITE messages being sent from the called party to the SBC/calling party, containing SDP information with different encoding rates in the "a=" attribute lines.

After the ACK message is sent by the calling party, the call established phase 320 begins, where a "2-way audio (RTP)" stream is established in which the end points exchange RTP packets conveying voice data. The call established phase may see SIP INVITE messages related to changing media stream parameters, but no SIP signaling is required to maintain the call session at this point. In general, SIP messages seen during the call established phase may alert the system that suspected infractions is being initiated. Finally, during the call disconnected phases 330, when either user wishes to end the call, a SIP request BYE message 440 is sent by the user initiating the call disconnect, and forwarded by SBC in 442. The other user responds with 200 OK message 444 (and 446 forwarded by the SBC) and the call is concluded. The "Cseq" header for all messages in this phase will be an integer different than that of the call setup phase 310, and different than the "Cseq" integer of any potential SIP messages that are sent during the call established phase 320.

As described previously, the arrival of unexpected SIP messages during particular call phases and the content of those aberrant SIP messages may be used to detect an infraction attempted by the called party. As is shown previously, FIG. 3A shows the call phases, and FIG. 4 illustrates the expected SIP messages received during those call phases. To enable the detection of this activity, the SBC 220 forwards all SIP signaling to the M&D module 300 for a particular call, as well as the voice data for other, non-SIP message related detection techniques. Therefore, the detection of an infraction relies on the ability of the M&D module 300 to track the call state of a call using the signaling received from the SBC.

As described above, FIG. 3B illustrates the exemplary embodiment of the M&D module 300. The M&D receiver 350 that receives all packets related to a call session, both SIP messaging and voice data, from the SBC 220. The module is capable of splitting the stream of packets into the SIP and voice data packet streams based on investigation of the packet headers which will have clear distinctions because SIP signaling uses TCP transport while voice data uses RTP based on UDP transport. The receiver 350 splits its received packets into SIP and voice data packets and forwards them to the SIP and voice data decoding modules 360 and 370 respectively. The SIP decoding module 360 is responsible for decoding SIP signaling including all SIP messages and their contents, setting a call phase flag in the call phase module 364 to signify the call state of the call between "call setup" and "call established" as in FIG. 4, and forwarding the SIP message information to the SIP detection module 362 for determining suspected infractions using both the SIP signaling and the call phase flag in 364.

Meanwhile, the voice data decoding module 370 is capable of decoding the voice packets from the SBC into their representative sound. To enable this, voice data decoding module 370 has knowledge of the encoding and decoding schemes used by the endpoints, as negotiated in the call setup phase 310 illustrated in the signaling flow of FIG. 4. 370 will then forward that sound to the voice data detection module 372, which uses that sound as well as the information contained in the call phase module 364 to detect suspected infractions using hook-flash detection, speech silence detection, and other techniques. The voice data decode module 370 will also forward information to 372 about packet characteristics of the voice data signal. For example, if there are no packets being received at 370 for a time period greater than some pre-determined threshold, then this information will be made available to module 372 as well. Depending on the call state of the call, the complete absence of voice packets for a period of time greater than this threshold will also be flagged as a form of speech silence, and may be flagged as suspected infractions.

Both the voice data and the SIP signaling, and the output from the SIP Detection and Voice Data Detection modules 362 and 372, are then communicated to the appropriate nodes in the call processing system 200, including the administrative workstation 240, call recording unit 270, and the JMS 230. As described before, the JMS may keep historical logs of suspected infractions and confirmed infractions for all inmates which are created directly in the M&D module 300, keeping policies for corrective action for various inmates according to their threat level, and maintaining allowed and called block lists. The administrative workstation 240 is used by prison personnel to either live monitor calls or that have been flagged in the M&D, issue live warnings, and disconnect calls manually. The workstations also set also may be used to set corrective action policies that are taken automatically by the M&D and the call processing system in the event that illicit activity is detected on an inmate call. The call recording unit 270 can be used to record audio calls that have been flagged in the M&D. The M&D is connected to the SBC, which can disconnect calls automatically if infractions are detected based on policies set by the administrative workstation.

FIG. 5A-5D show the operational flow for detecting infractions using SIP signaling in a call. In an exemplary embodiment this operational flow is implemented in the call processing system 200. At 502 a call request is made by an inmate user at a terminal 102a-n or 104a-n, at which point a call validation step 504 occurs, the stipulations of which are set by prison administrators. This call validation step is performed by the validation server 250 in conjunction with the JMS 230 and the administrative workstation 240, and involves multiple measures such as checking that the called party is allowable for that particular inmate, PIN entry for the inmate, biometric validation such as voice recognition and fingerprint verification of the inmate compared to that PIN, etc. Validation information such as fingerprint scans, voiceprints, and allowed and blocked called party lists may be stored within the JMS, the administrative workstations, or the validation server. Once the validation steps are completed, the call setup phase can begin at step 506, wherein the call flow for the call setup phase 310 as depicted in FIG. 4 commences between the calling party, the SBC, and the WAN 184. During the call setup phase, the M&D module 300 receives SIP signaling data from the SBC 220 by way of its receiver 350, which forwards all SIP related packets to the SIP decoding module 360. The SIP decoding module 360 sets the call phase flag in call phase module 364 to "call setup".

While the call setup procedure is occurring, at step 508, the SIP Detection module 362 continuously monitors the SIP messages received at SBC 220 for suspected infractions. The signaling message flow for this detection step is illustrated relative to FIG. 6-7, which will be described in detail later. If abnormal SIP signaling is detected at step 510, the SIP detection module 362 sends information to the administrative workstation and optionally to the JMS noting that a suspected infraction has occurred at step 512, and at step 514 further investigates the SIP signaling to confirm whether or not the suspected infraction is in fact disallowed. This is likely to be determined by the "contact" header field of one of the SIP messages received from WAN 184 after the initial activity is flagged as a suspected infraction in step 510. If the activity is determined to be allowed, a "YES" output will be generated at step 514 and the M&D module 300 will continue monitoring the call in step 508. If the activity is determined to be disallowed, a "NO" output will be generated at step 514 and the flow chart will go to FIG. 5C (labeled "B"), where another log of the activity is then sent to the administrative workstation and optionally to the JMS denoting that the suspected infraction is confirmed to be disallowed in step 545, and then a corrective action is taken at step 550. The corrective actions can be based on the specific disallowed called party that is being contacted, where called parties that are considered to be of higher risk will be acted upon more harshly than those lower risk called parties. The corrective action can also be based on the inmate's prior behavior, where, based on various thresholds, inmates who are determined to have higher propensity for illicit behavior will be punished more harshly than inmate's with more model behavior.

Figure 5A:
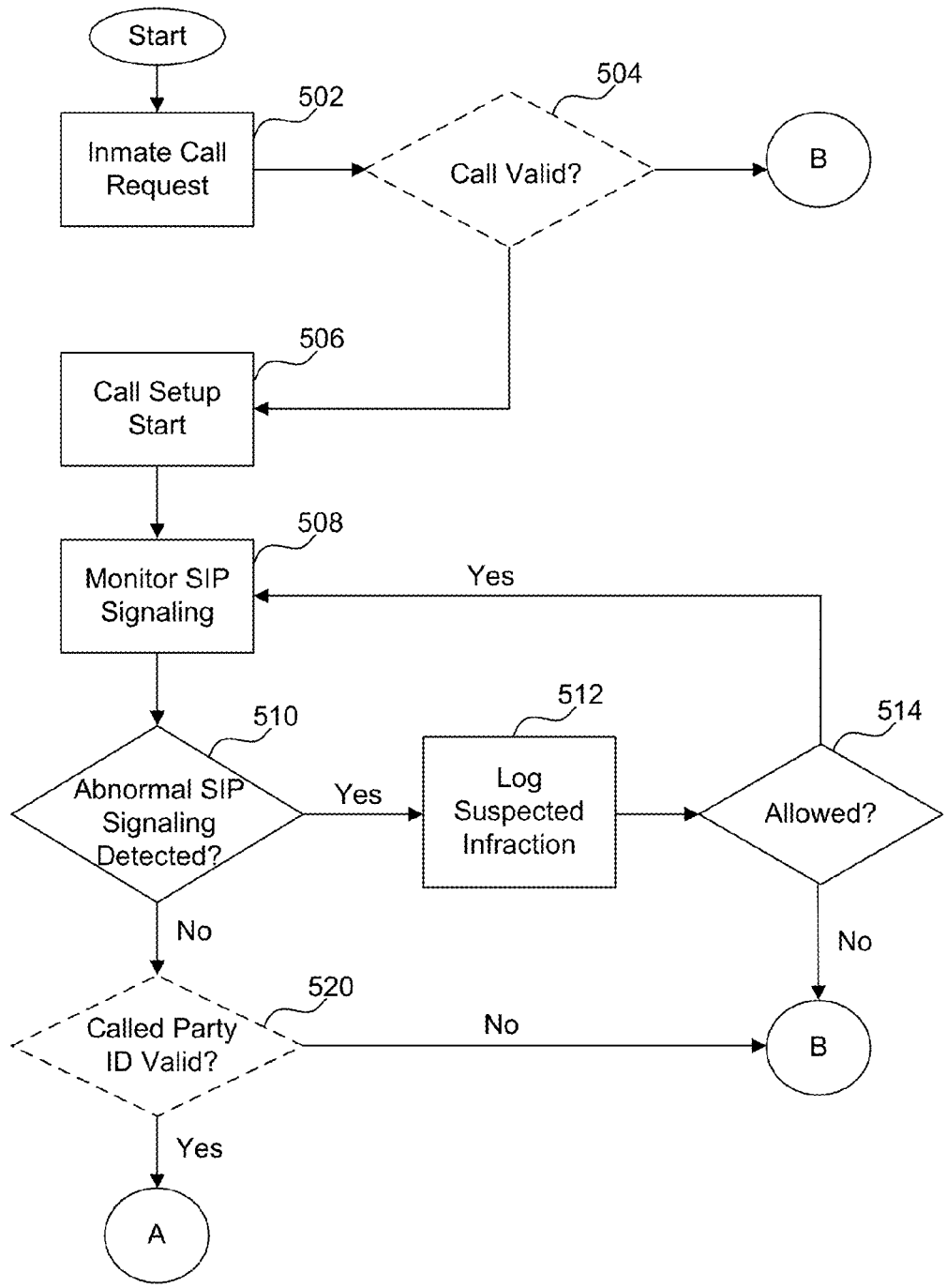
FIG. 5A-5D illustrate an operational flow diagram for monitoring voice calls, detecting infractions, and taking corrective actions according to exemplary embodiments of the present disclosure.
Figure 5B:
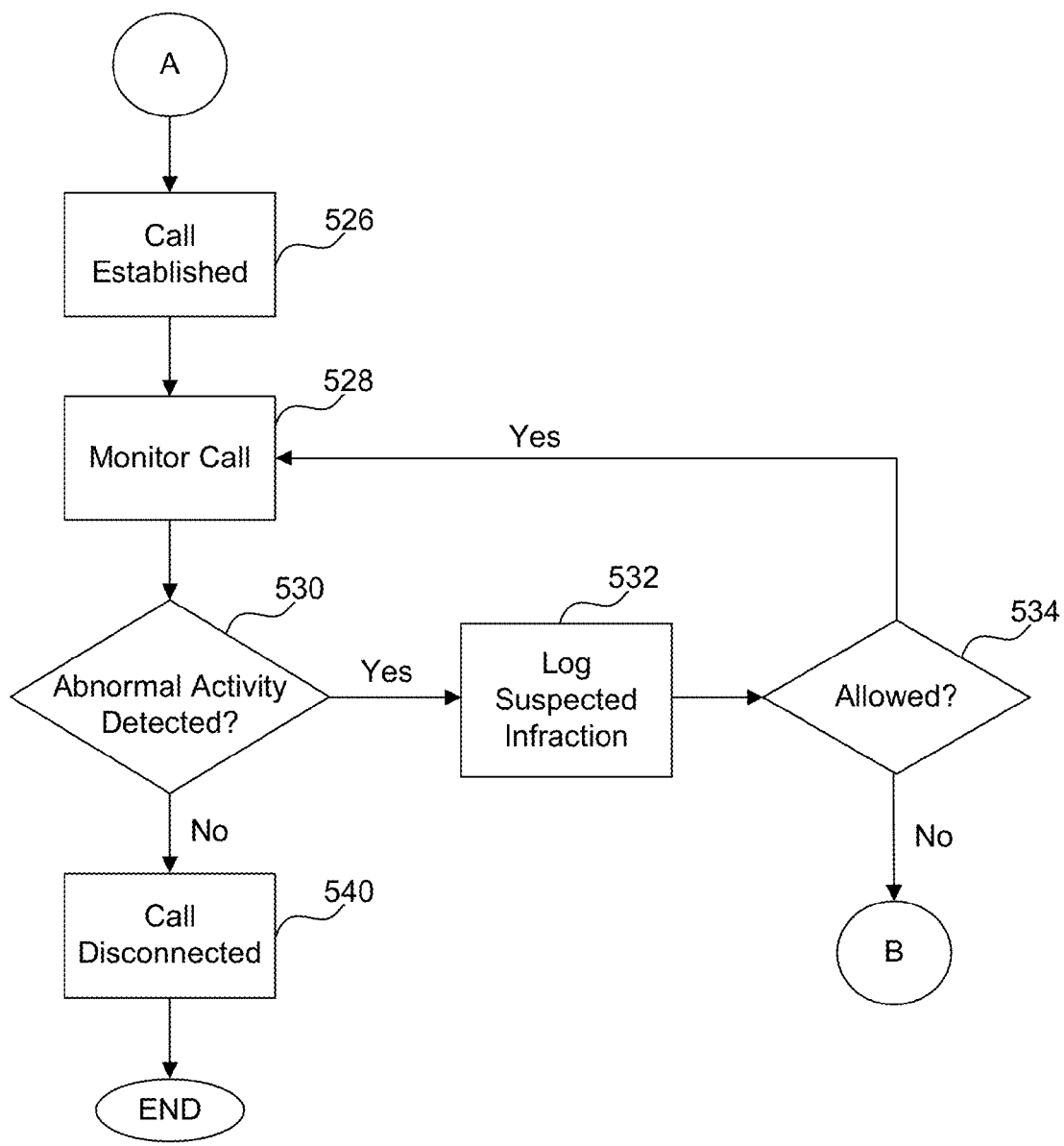
Figure 5C:
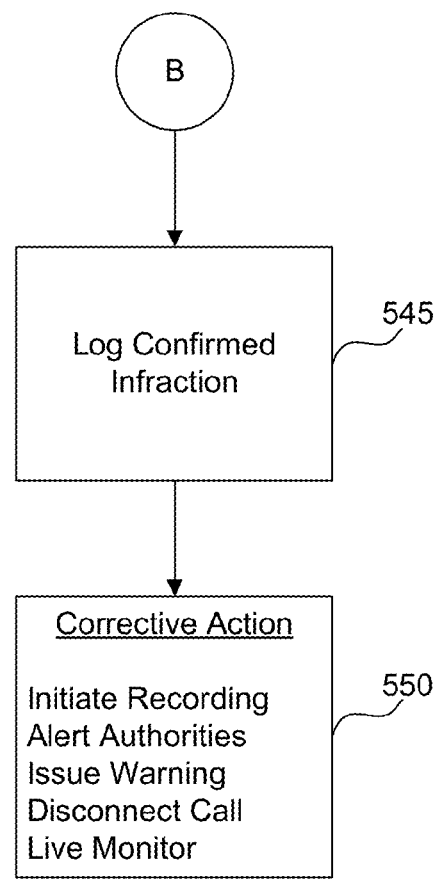

If during the call setup phase, no infractions are detected, then the call setup signaling is complete. At this point, the called party has accepted the session and can begin sending voice packets towards the SBC. After checking that the called party is the proper party in step 520, which may be an optional validation depending on the policy set by prison administration, the call setup phase is complete (shown as "A" in FIG. 5A) and the call established phase begins, as depicted in step 526 of FIG. 5B. At this time, the call phase flag in 364 of the M&D module 300 is changed to "call established." During the duration of the call, in step 528 the M&D module continuously monitors the call to detect suspected infractions. Because the call is now in the "call established" phase as set in module 364, the detection scheme of the SIP detection module 362 changes to capture suspected infractions as appropriate to the call established phase of the call, while the Voice Detection module 372 begins to run detection methods to determine infractions based on sound and voice-data. The Voice Detection module 372 is capable of running several existing detection algorithms based on the sounds occurring during the voice call, such as voice identification and signal-source separation wherein the number of voices is determined on the call. It is also capable of detecting speech silence and potential hook-flash sounds. It can also detect continuous noise generation, wherein inmates attempt to "mask" the sound of by creating continuous noise, such as through yelling or blowing into the receiver, that masks the sound of extended silences or hook-flash sounds. Both the SIP detection module 362 and the voice detection module 372 also have several embodiments unique to the present invention, which are described in more detail with reference to FIGS. 6-13. The operational flow of detection during the call established phase as depicted in FIG. 5B occurs in much the same way as the operational flow of detection during the call setup phase as shown in FIG. 5A. The call is continuously monitored in steps 528 and 530, and when an abnormal activity is detected in step 530, a "YES" output is generated, a log of that activity is sent to the administrative workstation and optionally to the JMS in step 532. Following that, the activity is further evaluated in the detection modules 362 and 372, and if the activity is determined to be disallowed, a "NO" output is generated and the operational flow progresses to the corrective action phase (point "B" in FIG. 5B). The operational flow of corrective actions taken is depicted in greater detail with respect to FIGS. 5C-5D. If the action is determined to be allowed, a "YES" output is generated and the M&D module 300 can go back to monitoring the call as in step 528.

The corrective actions themselves are listed in module 550. It should be understood that this embodiment is not limiting, and many other corrective actions can be taken in response to detected activity as new corrective actions are devised by prison authorities and designers of the prison communication system. Among these actions, a phone system may begin recording a call from the point of detecting the illegal activity (if calls are not recorded by default), issue a warning directly on the call line to direct the parties on the call to disengage in the infraction, disconnect the call outright by the SBC, allow a prison official to listen to the call live through one of administrative workstation 240 either with or without informing the call parties, or alert authorities outside of the prison such as police or courthouse officials.

Figure 5D:
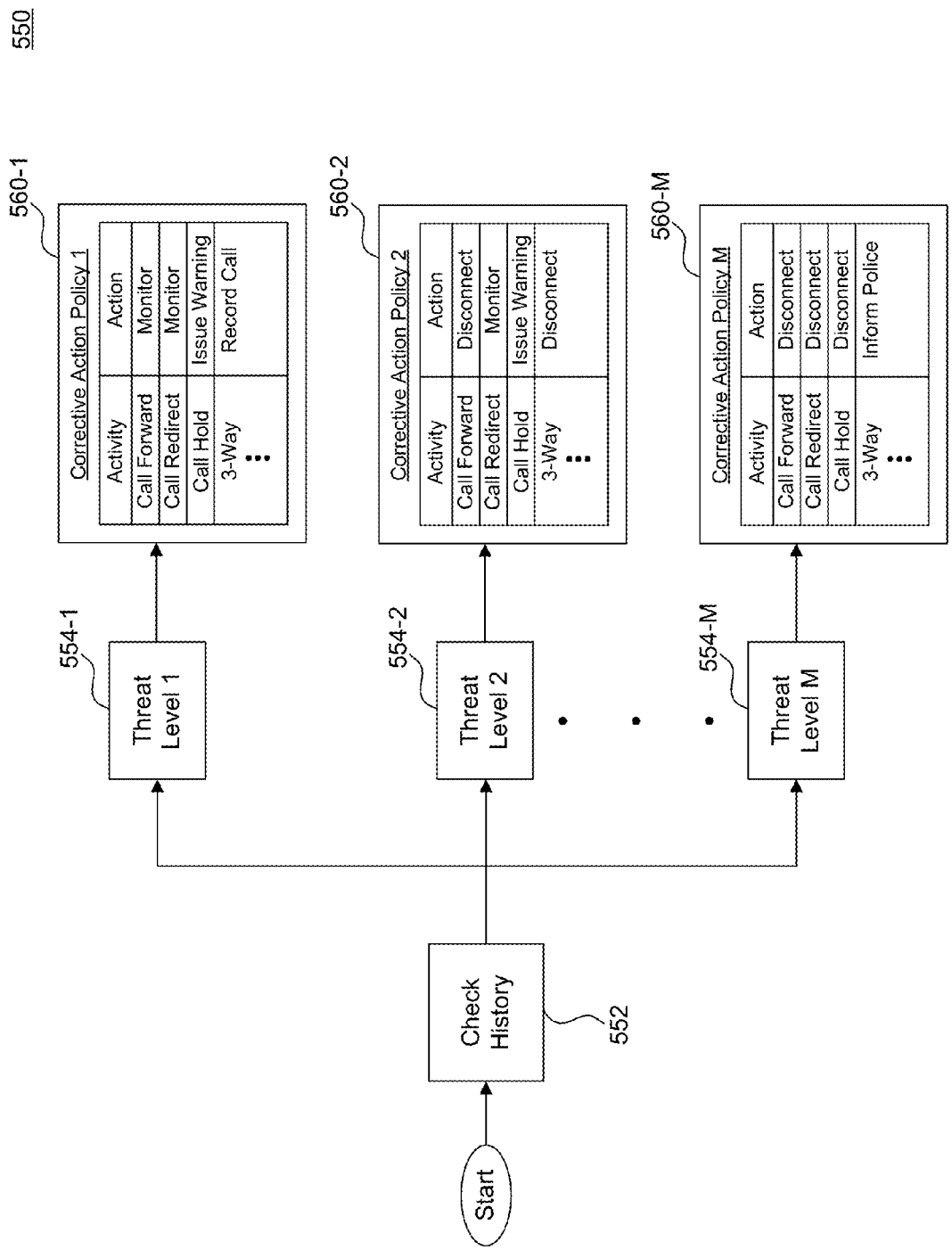

FIG. 5D is an embodiment detailing the functionality of the corrective action step 550. Specifically, the corrective action 550 consists of several policies 560-1-M that take different corrective actions for different types of infractions, where the severity of those corrective actions are dependent on the inmate's behavioral history and the called party history stored locally by the administrative workstation 240. As noted before, corrective action policy may be set by prison facility personnel at the administrative workstation 240. The process begins at step 552, where the M&D module 300 will perform a lookup of the inmate's and called party's behavior history. This step may occur prior to the call setup start 506. This user behavior consists of both telephone system infractions as well as in-house infractions such as altercations within the prison, and also information about the called party's history with telephone system infractions. Based on this history, the call is placed into one of the M groupings 554-1-M. Each of the groupings represent different threat levels that differentiate calls based on the severity of the past infractions of the call parties. Thus, 554-1 represents a "low threat" call, while 554-M represents an extremely "high threat" call.

The criteria for which threat level an inmate may fall into can be implemented in a number of ways. In one embodiment, the number of telephone infractions and in-house infractions that an inmate has engaged in for a given time window, for example the past year, may be summed together. The different infractions can also be weighted such that different infractions are given different values based on their severity. For example, a minor infraction such as a call-forwarding event may be given a score of 5 while a major infraction such as an altercation at the prison may be scored of 10, and these weighted scores are summed over the same time window. A weighted score of the called party based on how many infractions that called party has been engaged in can also be added to the score. The inmate is placed into one of the levels 554-1-M based on the score, where 554-1 is considered the lowest threat, 554-2 the second lowest, and so on up through 554-M, where a simple set of thresholds can be applied such that each threshold crossed represents an increase in threat level.

Additionally, logs made of suspected infractions in steps 512 and 532, prior to the confirmation step 514 and 534 which confirms whether or not a suspected infraction is in fact disallowed, are also be used in the scoring process. These suspected infractions are also scored in a similar fashion to the other infractions, and used as part of the total score used for classifying the threat level of a call. The reasoning behind this is that if an inmate seems to be engaged in a number of suspected infractions that are never confirmed to be disallowed activities, this may still be used as cause for increasing the scrutiny on that particular inmate's telephone communications.

Depending on what threat level the call reaches, one of the policies 560-1-M is applied to whatever infraction is engaged in by the inmate calling party and called party. The policies have different corrective actions depending on what infraction is detected, and also depending on the inmate level. Thus, a call in group 554-1 with a low-threat level may have a relatively lenient corrective action applied when a particular type of infraction is detected, while a call in group 554-M with a high-threat level may have a significantly more draconian measure applied to that same type of infraction. This is reflected in the lookup tables in each of the corrective action policy modules 560-1-M. For example, in 560-1, a detected "3-way" call may result in a relatively minor corrective action of recording of the call from the point when the 3-way call initiation is detected, while in 560-M, that same "3-way" call detection results in the prison administrators contacting the police. This embodiment is not meant to be limiting, but is meant to demonstrate the adaptability of the prison system to detections of different types of infraction and to different levels of past bad behavior by a particular inmate.

SIP Signaling Detection During Call Setup Phase

Figure 6:
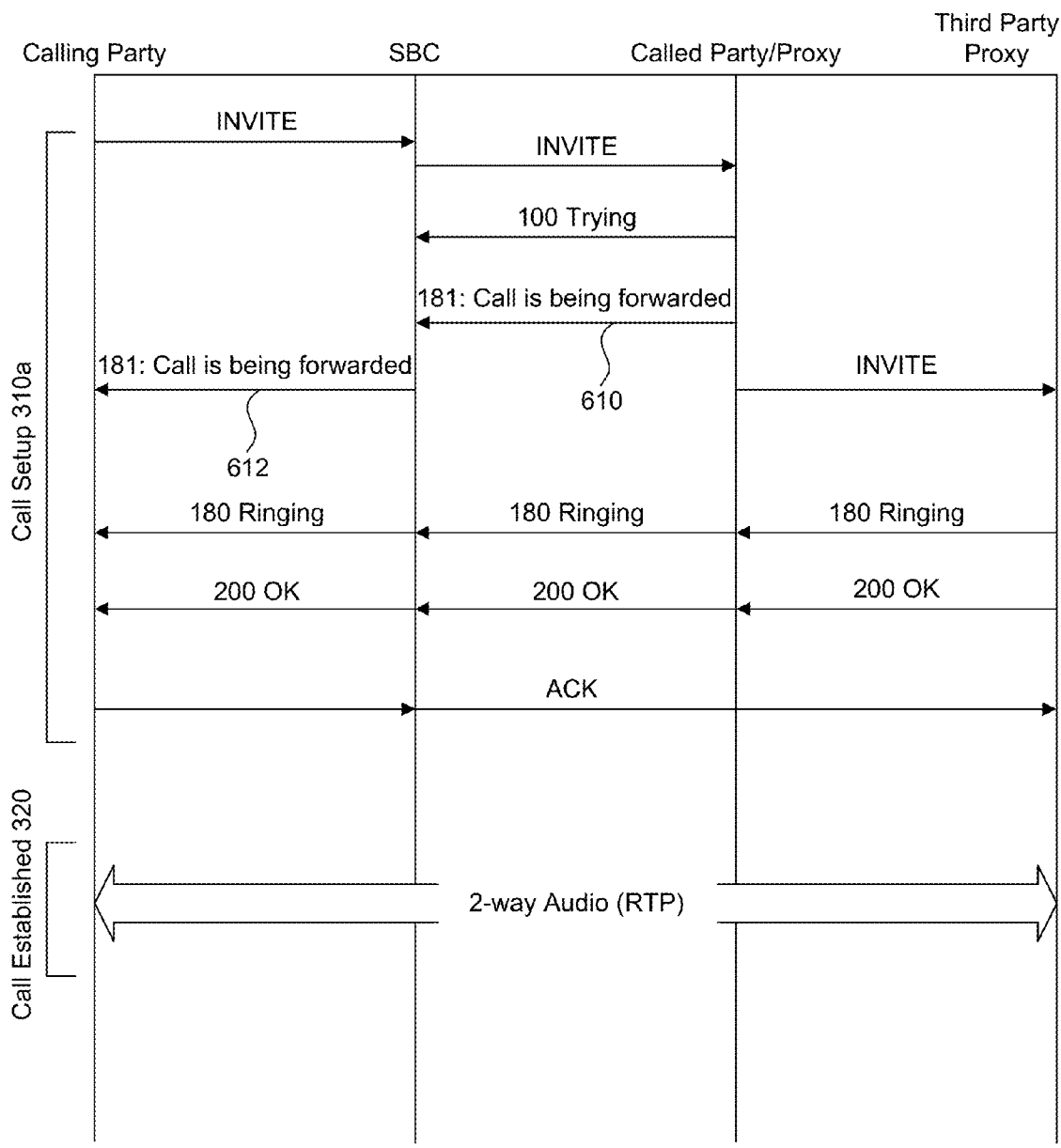
FIG. 6 illustrates a diagram of a signaling call flow for a call forwarding event initiated by a called party, according to exemplary embodiments of the present disclosure.
Figure 7:
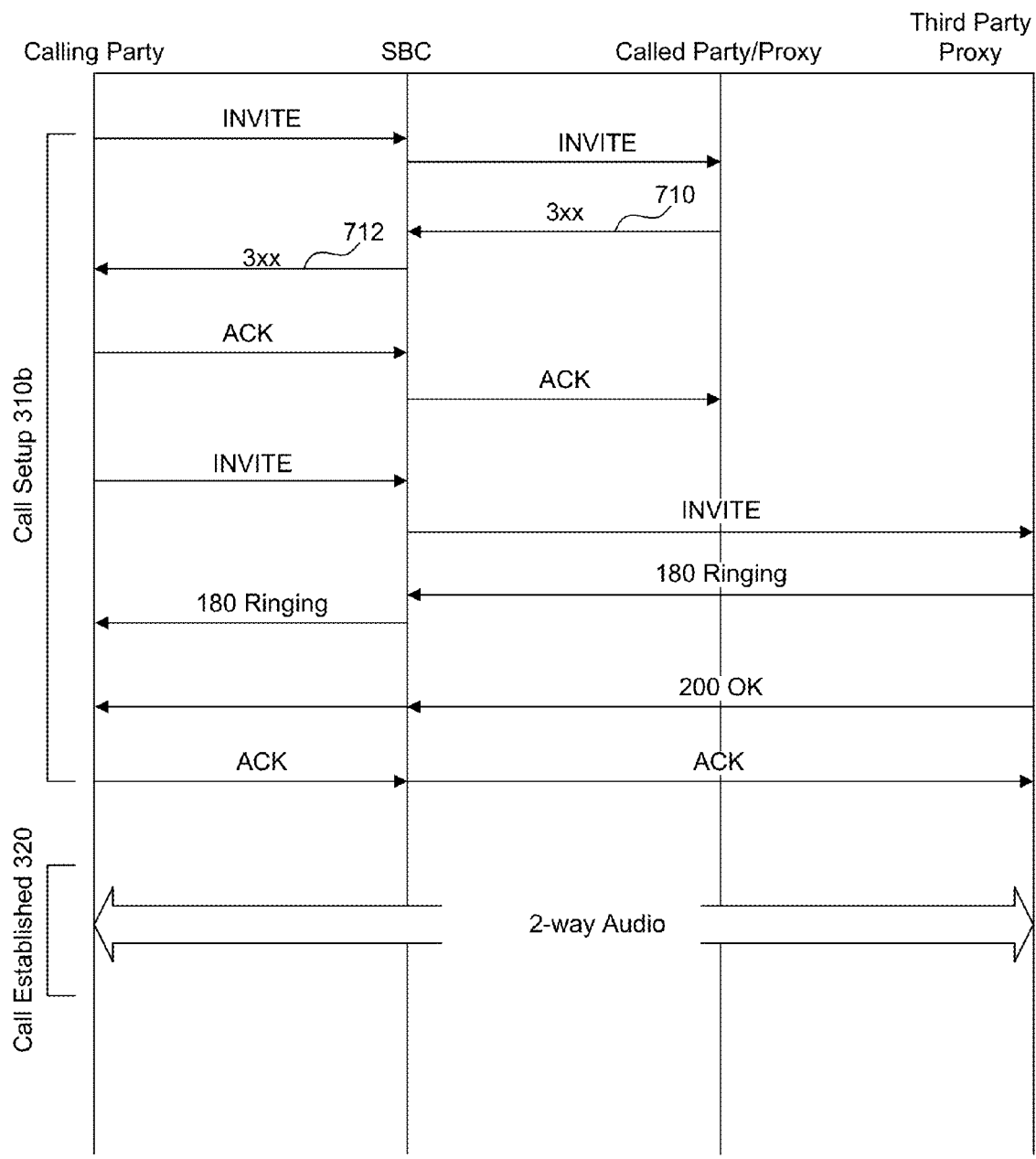
FIG. 7 illustrates a diagram of a signaling call flow for a call redirect event initiated by a called party, according to exemplary embodiments of the present disclosure.

FIGS. 6-7 depict two types of infraction between an inmate calling party and an allowed called party during the call setup phase 310. The general theme of infractions during the call setup phase typically manifests as the inmate calling party being connected to a party different from the one originally requested. Due to the available SIP functionality, this redirection occurs without any active input by the inmate calling party, and is thus not detectable by existing detection schemes. However, these procedures generally send some SIP response messages which can be detected by the M&D module 300. FIG. 6 depicts a scenario called "call forwarding," while FIG. 7 depicts a scenario called "call redirection." Both are described below.

Call Forwarding During the Call Setup Phase

FIG. 6 depicts a SIP signaling flow 600 for an exemplary embodiment of a call-forwarding event. The definition of a call-forwarding event is one in which, when a call session is requested by a calling party, the called party has arranged for the call request to be automatically sent to another called party. This "call forwarding" is automatically initiated upon contact with either the called party terminal itself, or a proxy that holds state information about the called party such as a SIP proxy server that serves the called party's VoIP call domain (e.g. the "voip-service-provider.net" domain used in SIP-URI "SIP: 12095559999@voip-service-provider.net"). This activity occurs specifically before the call setup phase has been completed, as the call setup to the originally called party is effectively replaced by a call setup procedure to a different called party. In many cases, this call forwarding can be legitimate even within a prison communication context if, for example, a particular called party has arranged for calls arriving at their home to be forwarded to a work line or cell phone. However, in many cases, this functionality may serve to enable the inmate to contact a disallowed called party by masking the initial call request, which would appear to be to an allowed called party, and these cases are ones that the M&D 300 is designed to detect.

The call flow can be described as follows. The call setup phase 310a begins in identical fashion to the nominal call setup phase 310 depicted in FIG. 4. An inmate requests a call with a particular called party, and call validation completes successfully indicating that the inmate is allowed to talk with that called party, as seen in steps 502 and 504 of the operational flow of FIG. 5A. The call setup phase begins. As seen in FIG. 6, an INVITE 15 sent from the calling party and forwarded by the SBC to a called party proxy server (such as a SIP server) serving the domain of the intended called party. This is followed by a SIP 100 "Trying" message. Following the SIP 100 "Trying" message, a message 610, a SIP 181 "Call is being forwarded" response message is sent from the proxy server back to the SBC, indicating that the intended original called party is forwarding calls to a third party. The 181 message is then forwarded from the SBC to the calling party in message 612, carrying essentially identical information. Importantly, while this SIP message indicates that action is being taken by the called party proxy to process the call with a third party, neither message 610 nor 612 contain the actual tel-URI or SIP-URI of the third party. Immediately following the message 610 being sent by the called party proxy, the called party proxy sends an SIP INVITE with an edited request line to a forwarded party proxy, which serves as a SIP server for a domain which is unknown to the prison calling system.

Once the forwarded party is reached, the forwarded party proxy will send a SIP 180 Ringing response message to the called party proxy, and that message will be forwarded to the SBC from the called party proxy in message 610 and to the calling party in message 612. Within this message, a "contact" header as described above populates which contains the information of the direct contact SIP-URI or tel-URI of the forwarded party, as this message signifies that the forwarded party has been contacted but has not yet accepted the call session. When the forwarded party accepts the call session request, a 200 OK is then sent from the forwarded party proxy to the SBC and the calling party, and a SIP ACK message is sent from the SBC directly to the forwarded party proxy. This concludes the call setup phase 310, and the call established phase 320 begins, wherein a 2-way audio RTP stream between the calling party and the new forwarded party is established to exchange voice data packets.

This call flow, therefore, is an exemplary embodiment of the infraction detection during the call setup phase, as depicted in steps 510, 512, and 514 of FIG. 5A. During the call setup phase at step 510, the M&D module 300, and more specifically the SIP decoding and SIP detection modules 360 and 362, detect that abnormal signaling has been received by the SBC if a SIP 181 response message is received from the called party either directly or via the called party proxy. Thus, a "YES" output is achieved at step 510 and a log of the suspected infraction is logged into the administrative workstation and optionally to the JMS at step 512. However, the M&D module 300 still has not confirmed that the call is being forwarded to a disallowed or unknown party. Thus, at step 514, the SIP decoding and detection modules 360 and 362 monitor subsequent SIP messages received by the SBC from the called party proxy (or other parties from outside of the prison system) to obtain the forwarded party tel-URI or SIP-URI information from the "contact" header field of one of those messages. At that point, a final decision can be made that the activity detected is either allowed or disallowed based on the SIP-URI or tel-URI being compared to allowed or block lists in the administrative workstation, leading to a "YES" or "NO" output from step 514. If a "NO" output is achieved, the operational flow moves to that of FIG. 5C, where at step 545 another log is sent to the administrative workstation and optionally to the JMS that the activity has been determined to be disallowed, and corrective action is taken at 550.

Call Redirect During the Call Setup Phase

FIG. 7 depicts a SIP signaling flow 700 for an exemplary embodiment of a call-redirect event. The call-redirect event is similar to the call-forwarding event, where a third party is contacted after the calling party makes an initial attempt to contact the intended called party. However, unlike the call forwarding event, the called party proxy server does not handle the call setup with the third party, but instead sends a SIP 3xx response message (3xx being one of multiple response message types from 300-399) back to the inmate calling party. The inmate calling party then initiates a new call session attempt, starting with an INVITE message, to a third party that is communicated in the 3xx message. In many cases, this call redirect can be legitimate even within a prison communication context if, for example, a particular called party has permanently changed its SIP-URI. However, in many cases, this functionality may serve to enable the inmate to contact a disallowed called party by masking the initial call request, which would appear to be to an allowed called party.

Referring to FIG. 7, the call setup phase 310*b* begins in identical fashion to the call setup phase 310 as depicted in FIG. 4. An inmate requests a call with a particular called party, and call validation completes successfully indicating that the inmate is allowed to talk with that called party, as seen in steps 502 and 504 of the operational flow of FIG. 5A. The call setup phase 310*b* then begins when an INVITE is sent from the calling party and forwarded by the SBC to a called party proxy server. The proxy server immediately sends a SIP 3xx response message (labeled as 710 in FIG. 7), indicating that the intended original called party is redirecting the call to a third party. The 3xx message is then forwarded from the SBC to the calling party in message 712. The 3xx message contains a contact header field that will store the SIP-URI for the third party, and the inmate calling party will then attempt to start a call session with that third party. The inmate calling party sends a SIP ACK message to the called party proxy, and then begins a call setup procedure with the third party. The call setup procedure with the third party has a similar signaling message flow as that depicted in the call setup phase 310 depicted in FIG. 4, except that the signaling messages are exchanged between the calling party and the new third party.

This call flow, therefore, gives an exemplary embodiment of infraction detection during the call setup phase, as depicted in steps 510, 512, and 514 of FIG. 5A. During the call setup phase at step 510, the M&D module 300, and more specifically the SIP decoding and SIP detection modules 360 and 362, detect that abnormal signaling has been received by the SBC if a SIP Response 3xx message is received from the called party either directly or via the called party proxy. Thus, a "YES" output is achieved at step 510 and a log of the suspected infraction is logged into the administrative workstation and optionally to the JMS at step 512. However, the M&D module 300 still has not confirmed that the call is being forwarded to a disallowed or unknown party. Thus, at step 514, the SIP decoding and detection modules 360 and 362 will find the SIP-URI contained in the contact header of the received SIP Response 3xx message, or monitor subsequent SIP messages received by the SBC from the third party proxy to obtain the third party tel-URI or SIP-URI information from the "contact" header field of one of those messages. At that point, a final confirmation can be made that the activity detected is either allowed or disallowed by comparing the SIP-URI or tel-URI of the third party to the allowed or blocked call lists contained in the administrative workstation (received from the JMS), leading to a "YES" or "NO" output from step 514. If a "NO" output is achieved, the operational flow moves to that of FIG. 5C, where another log in the administrative workstation is made of the confirmed infraction at step 545, and corrective action is taken at 550.

SIP Signaling Detection During the Call Established Phase

Figure 8:
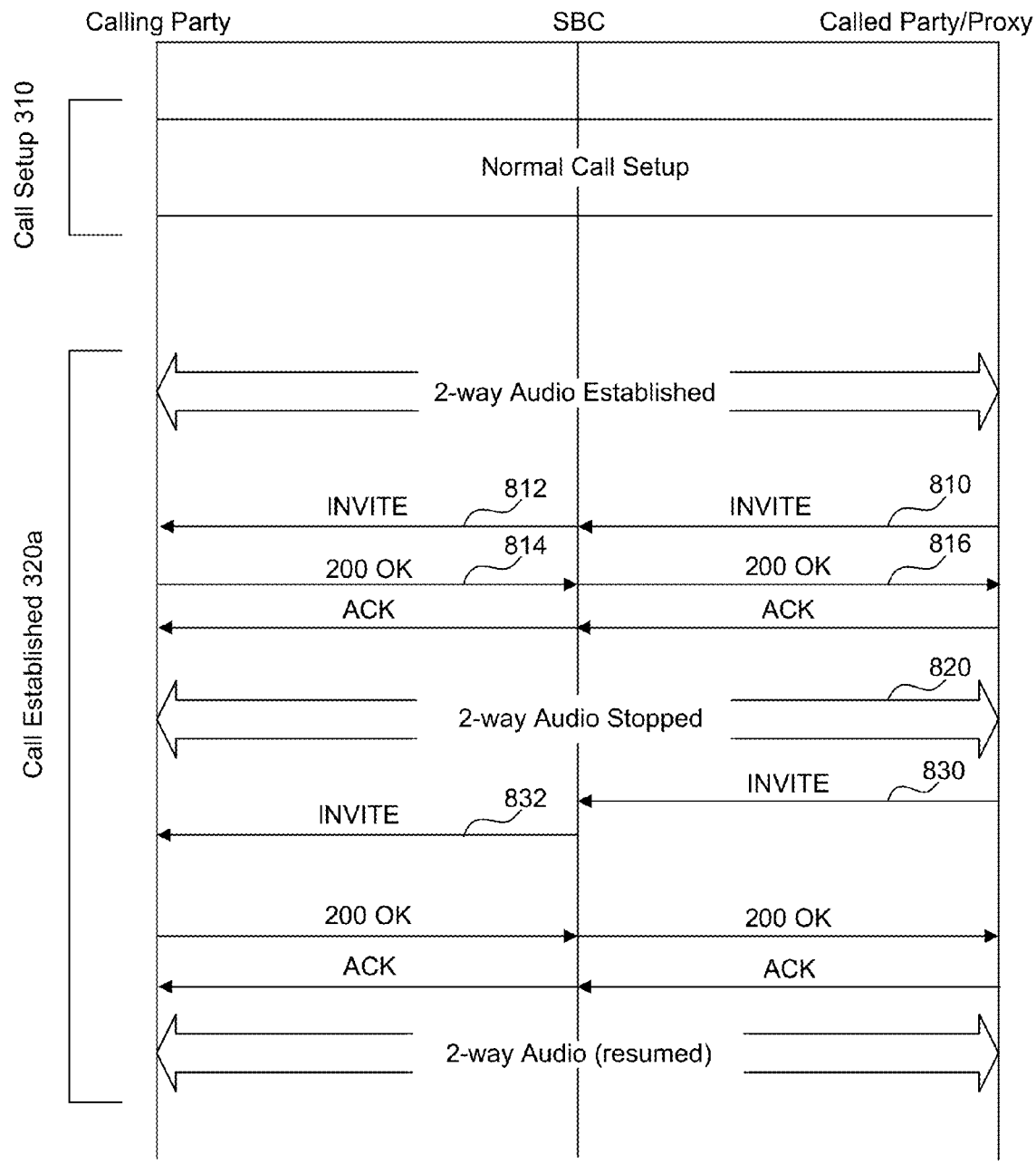
FIG. 8 illustrates a diagram of a signaling call flow for a call hold event initiated by a called party, according to exemplary embodiments of the present disclosure.
Figure 9:
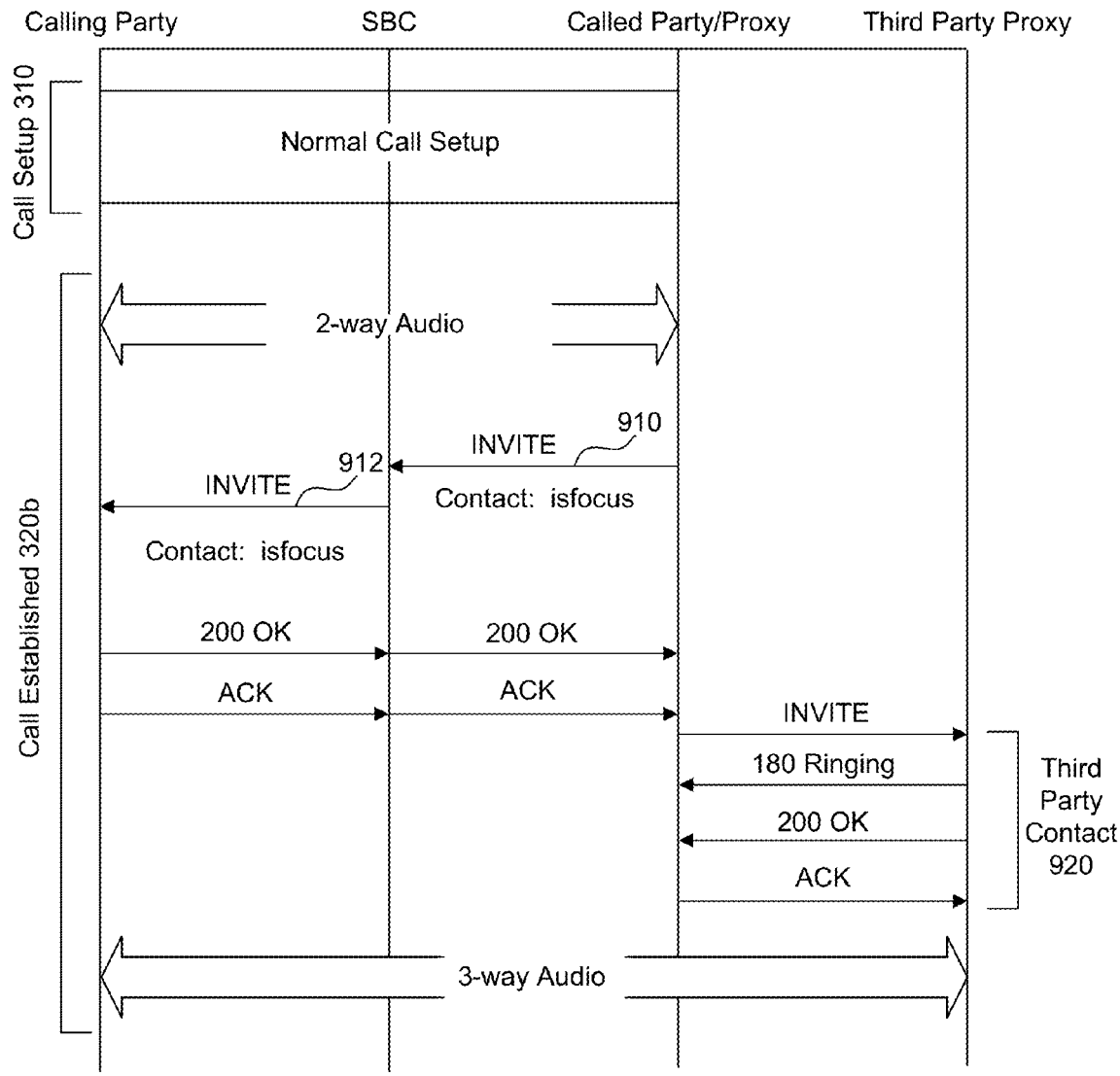
FIG. 9 illustrates a diagram of a signaling call flow for a call conferencing event for three-way calling initiated by a called party, according to exemplary embodiments of the present disclosure.
Figure 10:
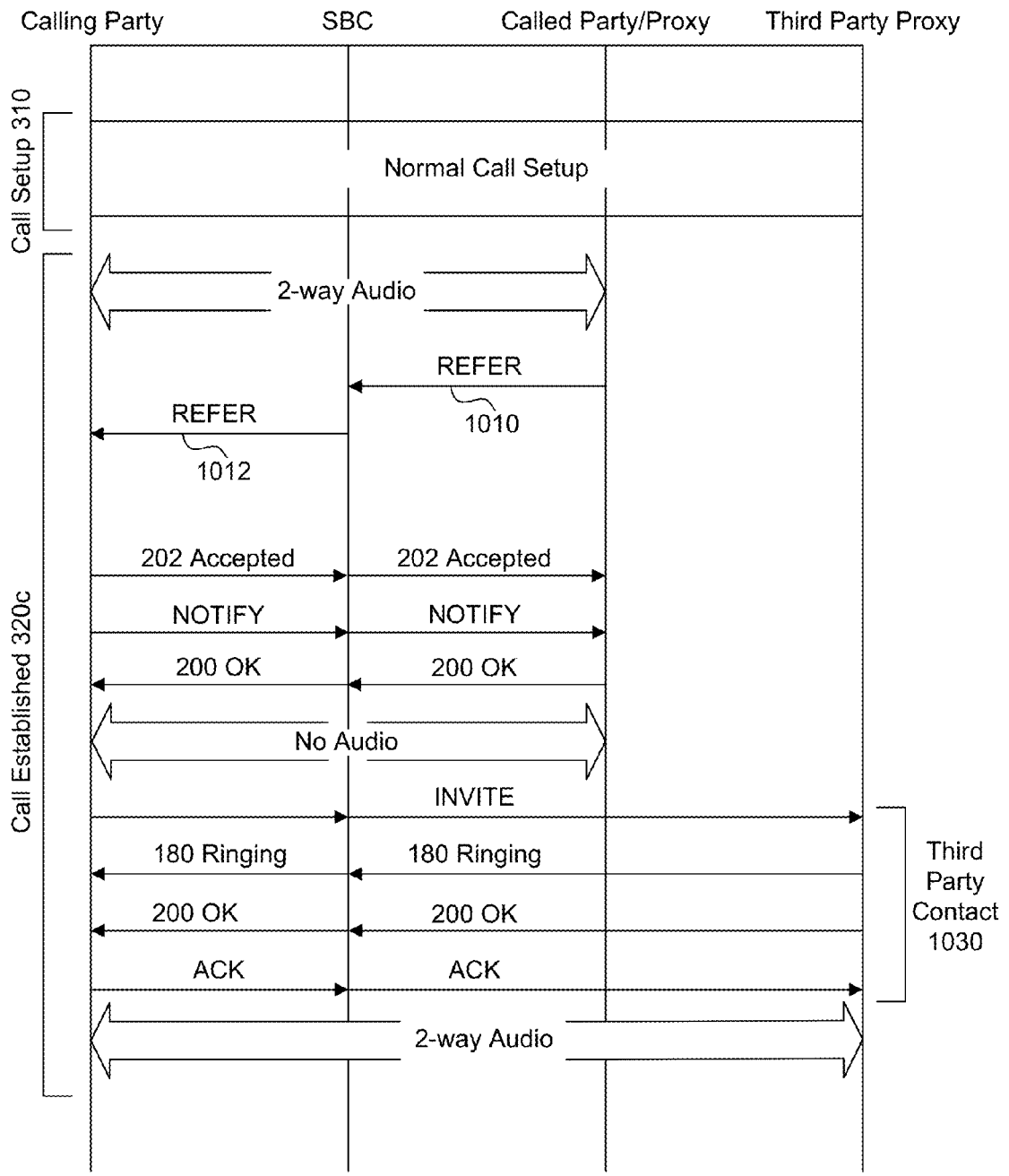
FIG. 10 illustrates a diagram of a signaling call flow for a call transfer event for three-way calling initiated by a called party, according to exemplary embodiments of the present disclosure.

FIGS. 8-10 depict various scenarios of infractions between an inmate calling party and an allowed called party after a successful call setup. FIG. 8 depicts a SIP signaling flow for an exemplary embodiment of a call hold event by the called party. FIG. 9 depicts a SIP signaling flow for an exemplary embodiment of a call conference initiation by the called party. FIG. 10 depicts a SIP signaling flow for an exemplary embodiment of a call transfer event initiated by the called party. All three are described below.

Call Hold Initiated by the Called Party

FIG. 8 depicts an embodiment of a call hold event wherein the called party places the calling party on hold. This is a common occurrence when the called party is answering a call on a call-waiting line, or when the called party is initiating a call with a third party with the intention of connecting the calling party with the third party in a three-way call communication. Following the call hold event, the called party will resume the call with the inmate calling party, at which point, if a third party has been connected to the called party, all three parties will share a single call session and be able to interact with each other. As implied by the scenario, call hold occurs after a call has been successfully established, and thus, occurs during the call established phase 320.

The call flow begins with a call setup phase 310, in which a call setup is successfully completed as shown in the call setup phase 310 of FIG. 4. The call established phase 320*a* begins with a two-way audio RTP stream between the called party and the calling party. While a two-way communication is ongoing between the inmate calling party and the called party, the called party may send an INVITE message 810, sometimes called a "re-INVITE," to the inmate calling party, which is received by the SBC. The SBC forwards this message to the inmate calling party in message 812.

The INVITE message will contain SDP information in the message body to renegotiate the parameters of the audio stream. Specifically, the SDP information will contain an attribute line "a=sendonly" that indicates that the called party will only send audio rather than receive it. The SDP information may also contain "a=inactive" indicating that the called party wishes to change the audio stream such that neither party sends voice data to the other via the RTP packet stream. The inmate calling party may respond with a 200 OK message at 814 signifying the calling party's agreeing to the proposed parameter change. In the case of receiving a re-INVITE 810 with the "a=sendonly" attribute line, the 200 OK message contains an attribute line "a=recvonly" indicating the inmate calling party's agreement to only receive audio packets from the called party, which previously indicated that it would only be sending and not receiving voice data. If the re-INVITE 810 contains a "a=inactive" line, then the 200 OK 814 also contains an attribute line "a=inactive". The called party sends an ACK message to indicate that it has received the 200 OK from the inmate calling party.

At this point, at 820, the 2-way audio stream has ceased in favor of either a completely inactive audio stream or a one-way audio stream. In the former case, neither the inmate calling party nor the called party will send packets to the SBC. In the latter case, the inmate calling party has ceased sending RTP packets to the called party via the SBC, implying that the inmate terminal itself has stopped transmitting voice data packets if the inmate terminals are VoIP-capable, or that the translation apparatus lying between the inmate terminal and the SBC has stopped transmitting voice data packets. RTP packets may still be received from the called party. In some cases, the packet stream will be identical to the packet stream prior to the call hold being initiated, in which RTP packets will carry encoded sound representing silence because the called party is not on the line. More likely, however, is that the RTP packets being received may be representative of the use of a silence suppression scheme, in which a party only encodes audio packets for transmission when it detects that the party is actually speaking. The purpose of such silence suppression schemes is to improve bandwidth utilization by reducing or outright stopping the transmission of packets when a party is not speaking. Because conversations are estimated to be more than 50% silence, a well-designed silence suppression scheme can result in significant bandwidth savings while having only negligible effect on sound quality.

To enable silence suppression, the encoders of both parties typically include a Voice Activity Detector (VAD) that determines whether or not the party is speaking based on certain pre-determined thresholds. If a party is silent, Silence Insertion Descriptor (SID) packets may be generated that represent parameters that can be used to replicate the background noise occurring on the party's end of the call, rather than encoded sound from that party. SID packets, rather than packets of encoded sound, will be sent from the silent party to the other party. These packets still travel in the RTP stream, but have packet header and payload differences which make them recognizable and separable to the decoder of the receiving party. At the receiving end, SID packets are interpreted by a Comfort Noise Generator (CNG), which then plays noise into the party's terminal (i.e. background noise plays in the ear piece of the terminal) generated from the parameters specified in the SID packets. VAD and CNG schemes are highly configurable, such that SID packets can be sent and received at various rates depending on the aggressiveness of the silence suppression scheme. This aggressiveness determines how much bandwidth is saved during the silence periods. To enable the usage of these packets in any suspected infraction detection schemes, the voice decoding module 370 also implements the ability to decode SID packets.

When the called party wishes to cease the call hold, it will then send yet another re-INVITE message 830 that contains attribute line "a=sendrecv" in its SDP information, indicating its desire to renegotiate the audio stream parameter with the inmate calling party. As implied, "sendrecv" indicates the called party's desire to renegotiate the audio stream to both send and receive voice data. The subsequent 200 OK message sent from the inmate calling party also contains "a=sendrecv" indicating the inmate calling party's agreement to resume the stream. The call hold event ends when the 2-way audio stream is resumed.

This call flow, therefore, gives the exemplary embodiment of the infraction detection during the call established phase, as depicted in steps 530, 532, and 534 of FIG. 5B. During the call established phase at step 526, the M&D module 300, and more specifically the SIP decoding and SIP detection modules 360 and 362, detect that abnormal signaling has been received by the SBC if an INVITE message is received during the call established phase. At this point, a "YES" output is achieved at step 530 and a log of the suspected infraction is logged into the administrative workstation and optionally to the JMS at step 532. At step 534, the SIP decoding and detection modules 360 and 362 read the INVITE message contents to determine if the attribute line "a=sendonly" or "a=inactive" is present, and if so, a "NO" output is achieved at step 534 and corrective action can be taken in accordance with the operational flow depicted in FIG. 5C. Similarly, if a 200 OK message containing "a=recvonly" or "a=inactive" is detected by the SIP decoding and SIP detection modules 360 and 362, these same steps would occur.

A log of the confirmed infraction can be sent to the administrative workstation and optionally to the JMS in step 545 confirming that the INVITE represents a call hold event, and corrective action can be taken at step 550. One thing to note is that, because of the more ambiguous nature of a call hold event, the corrective action taken can be adjusted to a less draconian measure for this type of event. A call hold event is very often a sign of an infraction such as a third party added to a call, but the third party may be an allowed third party, for example another lawyer for an inmate, or no third party may be added at all. Thus, prison officials may decide to set a more lenient policy for detections of call hold in the administrative workstation. For example, rather than automatically disconnecting the call, the corrective action taken can simply be to issue a warning to the call, monitor the call through an administrative workstation such that a live prison official can confirm that the call hold is for legitimate reasons, or record the call for further scrutiny at a later time.

The peculiarities of the voice data packet flow can also be taken into account in steps 530, 532, and 534 to determine that an infraction is taking place. As implied above, one indicator of call hold is when the voice data packet flow from the inmate calling side ceases completely for a significant period of time. The SBC may also stop receiving packets from the called party, or only receive SID packets for an extended period of time. Thus, another rule that can be used in the abnormal activity detection module 530, enabled by the voice data decoding and voice data detection modules 370 and 372, can be the complete absence of packets received by the SBC, and therefore M&D module 300 from the inmate calling party or the called party for a time period greater than a pre-determined threshold, or only receiving SID packets from the SBC from the called party for a time period greater than another pre-determined threshold. This will result in the same considerations in steps 530, 532, and 534 to send logs to the administrative workstation and optionally to the JMS and take corrective action.

Call Conferencing Initiated by the Called Party

FIG. 9 depicts an embodiment of a call conferencing event initiated by the called party, in which the called party sends a SIP re-INVITE to renegotiate the session parameters with the inmate calling party. Specifically, the SIP re-INVITE will indicate to the inmate calling party that the called party contact is now a "focus" user. A "focus" user handles SIP signaling relationships with multiple users and also handles "media mixing" which allows the sounds of multiple callers to be combined into one RTP stream, which is then transmitted to the appropriate parties in the call session. Thus, the called party essentially becomes a conference server for the inmate calling party, the called party, and a third party that is added to the call.

The flow of FIG. 9 depicts an embodiment of a conference call initiated by the called party. This particular flow depicts the addition of a third party by the called party, and although other forms of conference initiation are possible, the SIP messages received at the SBC will typically be very similar when the called party acting as the focus point of the conference. FIG. 9 begins with a successful call setup phase 310 in which a call request is successfully validated and call initiated with the intended called party. This is followed by the call established phase 320b, where 2-way audio in the form of RTP packet flow is established between the inmate calling party and the called party via a called party proxy server. When the called party attempts to initiate the conference call, the called party will send a re-INVITE message 910 to the SBC. The re-INVITE message contains a "contact" header field with a SIP-URI, which may be the same as the SIP-URI appearing in the contact header of SIP messages during the call setup phase 310, and an additional string "isfocus" which indicates that the called party is attempting to create a conference call. This message is, as usual, forwarded to the inmate calling party in message 912, and the inmate calling party will then send a 200 OK response back to the called party through the SBC. The called party will send an ACK message back to the SBC and calling party acknowledging the receipt of the 200 OK, at which point the renegotiation is complete.

At the same time, the called party will establish an additional call session with a third party, as depicted in abbreviated form in the "third party contact" procedure 920. Note that these messages are completely transparent to the inmate calling party, as the setup procedure 920 is handled completely by the called party and the third party. As such, it is not possible to use the messages to detect any form of infraction by the inmate calling party or called party. For clarity the messages are shown occurring at a separate time from the called party's interaction with the inmate calling party, but in general the message flows between the called party the inmate calling party, and the called party and the third party, will be occurring simultaneously.

The third party contact procedure 920 is essentially the same as a call setup phase 310, where the called party is acting as a calling party initiating the connection by sending an INVITE. The 180 Ringing, 200 OK, and ACK messages sent between the called party and the third party are substantially the same as those between the inmate calling party and the called party in call setup phase 310, but with the session information changed to appropriately reflect the called party and third party SIP-URIs. The contact header information in messages sent by the called party will also contain the "isfocus." The addition of a third party may occur in slightly different interactions, also transparent to the inmate calling party, but the key interaction between the inmate and the called party remains the re-INVITE containing the "isfocus" flag as described above. Following all of these steps, the call will then appear as a "3-way audio" call between the inmate calling party, the called party, and the third party, with the called party serving as the "mixer" between the three users.

The format of the 3-way audio is actually that of two 2-way audio streams. An RTP stream from the inmate calling party is sent to the called party, and an RTP stream from the third party is also sent to the called party. However, no RTP stream is sent directly from the inmate calling party to the third party. Instead, the called party, acting as a "mixer," decodes the encoded sound from the two other parties, mixes the sound and re-encodes a new RTP packet which essentially combines the sounds of the two speakers. Thus, the RTP stream sent from the called party to the inmate calling party, and the RTP stream sent from the called party to the third party, are streams that are formed by the mixing of the decoded sound from the individual speakers. The called party maintains two 2-way audio streams with the inmate calling party and third party, while the inmate calling party and third party are just part of one 2-way audio stream with the called party.

This call flow, therefore, gives an exemplary embodiment of the infraction detection during the call established phase, as depicted in steps 530, 532, and 534 of FIG. 5B. During the call established phase at step 526, the M&D module 300, and more specifically the SIP decoding and SIP detection modules 360 and 362, detect that abnormal signaling has been received by the SBC if an INVITE message is received during the call established phase. At this point, a "YES" output is achieved at step 530 and a log of the suspected infraction is logged into the administrative workstation and optionally to the JMS at step 532. At step 534, the SIP decoding and detection modules 360 and 362 read the INVITE message contents to determine if the contact header field contains the string "isfocus", and if so, a "YES" output is achieved at step 534 and corrective action can be taken in accordance with the operational flow depicted in FIG. 5C. A log can be sent to the administrative workstation in step 545 confirming that the INVITE represents a call hold event, and corrective action can be taken at step 550. As was the case for the call hold event, the call conference event may be a more ambiguous activity as well, and the corrective action taken can be adjusted to a less draconian measure to reflect that ambiguity. After all, a third party may be an allowed third party relative to the inmate calling party. Thus, prison officials may decide to set a different corrective action policy for detections of in the administrative workstation. For example, rather than automatically disconnecting the call, the corrective action taken can simply be to issue a warning to the call, monitor the call through an administrative workstation such that a live prison official can confirm that the call hold is for legitimate reasons, or record the call for further scrutiny at a later time.

Call Transfer Initiated by the Called Party

FIG. 10 depicts an embodiment of a call transfer event initiated by the called party, in which the called party sends a SIP REFER request to the calling party requesting the calling party initiate a session with a third party and end the session with the called party. Specifically, the REFER message is sent by the called party with a SIP-URI of a third party that the inmate calling party should contact to create a new session. This information is contained in a header field called "Refer-To," with an accompanying header field "Referred-by" which contains the original SIP-URI of the party sending the REFER message. It is important to note that this procedure occurs without any active input on the part of the inmate calling party. Thus, the inmate calling party is not forced to request a new call with the call processing system 200, and could succeed with the call transfer to a third party undetected unless new detection apparatus, such as that described in embodiments of the present invention, are created to detect such events.

Referring to FIG. 10, the call begins with a successful call setup phase 310 in which a call session is established between an inmate calling party and called party. Again, the signaling message flow mimics the same flow for call setup phase 310 depicted in FIG. 4. At the beginning of call established phase 320*c*, a 2-way audio stream of voice data is present. When the called party wishes to initiate the transfer, the called party sends a SIP REFER message 1010 to the SBC, which is then forwarded to the inmate calling party in message 1012. This message contains the header field "Refer-to" which contains a SIP-URI for the third party that the called party is "referring" the inmate calling party to call, and the "Referred-by" header field containing the SIP-URI address of the called party. If the inmate calling party accepts the request, it sends a SIP 202 "Accepted" response message back toward the calling party, followed by a SIP NOTIFY message, which essentially signals the called party that the inmate calling party is going to initiate a call session teardown with the called party. After a 200 OK is received by the inmate calling party, the inmate calling party then initiates the call session teardown with the called party through a SIP BYE message, followed by the receipt of a 200 OK from the called party.

Then, a call setup procedure 1030 with a third party begins. This procedure closely mirrors a typical call setup phase 310, but between the inmate calling party and a third party with the appropriate changes to the SIP message fields. After the call setup phase is completed with the third party, a 2-way audio session comprising the exchange of RTP voice data is established between the inmate calling party and the third party.

This call flow, therefore, gives an exemplary embodiment of infraction detection during the call established phase, as depicted in steps 530, 532, and 534 of FIG. 5B. During the call established phase at step 526, the M&D module 300, and more specifically the SIP decoding and SIP detection modules 360 and 362, detect that abnormal signaling has been received by the SBC if a REFER message is received from the called party during the call established phase. At this point, a "YES" output is achieved at step 530 and a log of the suspected infraction is logged into the administrative workstation and optionally to the JMS at step 532. At step 534, the SIP decoding and detection modules 360 and 362 read the REFER message contents to check if the "Refer-To" header field contains a SIP-URI or a tel-URI that has been deemed allowable, and if not, a "NO" output is achieved at step 534 and corrective action can be taken in accordance with the operational flow depicted in FIG. 5C. A log can be sent to the administrative workstation and optionally to the JMS in step 545 confirming that the REFER represents a call-transfer event to a disallowed or unknown party, and corrective action can be taken at step 550. Unlike both the call hold and call conference event, the SIP-URI contained in the "refer-to" field gives definitive confirmation of whether or not the call-transfer event is allowed, as the SIP-URI contains definitive contact information of the third party. As such, prison officials may choose a corrective action policy that is more strict regarding the detection of this type of activity.

Disallowing SIP Functionality

Implied in all of the flows depicted in FIGS. 6-10 is that in order for inmate calling parties to be engaged in the illicit activities depicted in these embodiments, there is a certain amount of interaction and response that has to be allowed by the inmate terminals and the call processing system 200 generally. After all, in most of these cases, a SIP response message is generally sent from the inmate calling party to the called party after the messages initiating the suspected infraction are sent by the called party. As such, prison officials may choose, through either the design of special terminals and equipment, or by setting policies and parameters in already available software on the SBC and the terminals, to prevent such response messages from being sent to the outside called parties, or to simply suppress the called party messages from being received by the inmate calling party at all.

For example, in FIG. 6, the final 200 OK message received by the inmate calling party or the ACK message sent by the inmate calling party to the other party may simply be suppressed by the SBC, which would prevent the call from occurring. Likewise, in the call hold embodiment of FIG. 8 and the call conferencing embodiment of FIG. 9, the SIP INVITE messages 810 and 910 could be suppressed by the SBC such that the SIP message is never received by the inmate calling party, and thus, no initiation of suspected infraction would take place. Likewise in FIG. 10, the REFER message 1010 could likewise be ignored.

Depending on prison administration and policy, measures could be undertaken to simply filter for messages that initiate suspected infractions and take any corrective actions deemed necessary. Such strict measures could be appropriate for inmates with particularly poor behavioral histories as defined by the JMS. Alternatively, the operational flow of FIG. 5A-5D could be adapted to automatically punish any suspected infraction. For example, rather than evaluating the permissibility of the suspected infraction in steps 514 and 534, all actions could be deemed disallowed (i.e. the output from steps 514 and 534 could be set to "NO" for any abnormal detection in steps 510 and 530) and corrective action could be taken immediately in steps 545 and 550.

Infraction Detection from Direct Interaction with the PSTN

Figure 11:
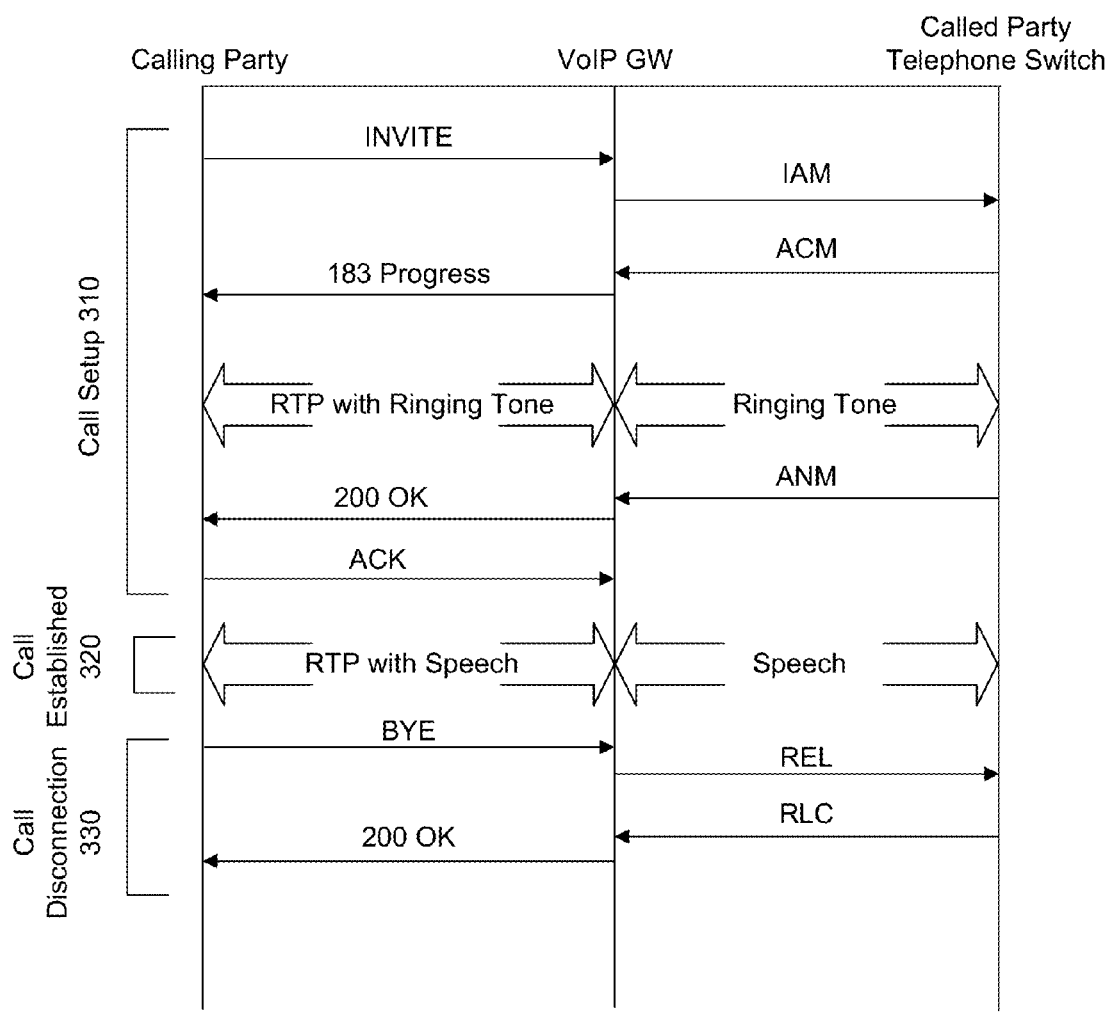
FIG. 11 illustrates a diagram of a signaling call flow for a voice call established between a VoIP-capable inmate calling party and a PSTN called party, according to exemplary embodiments of the present disclosure.
Figure 12:
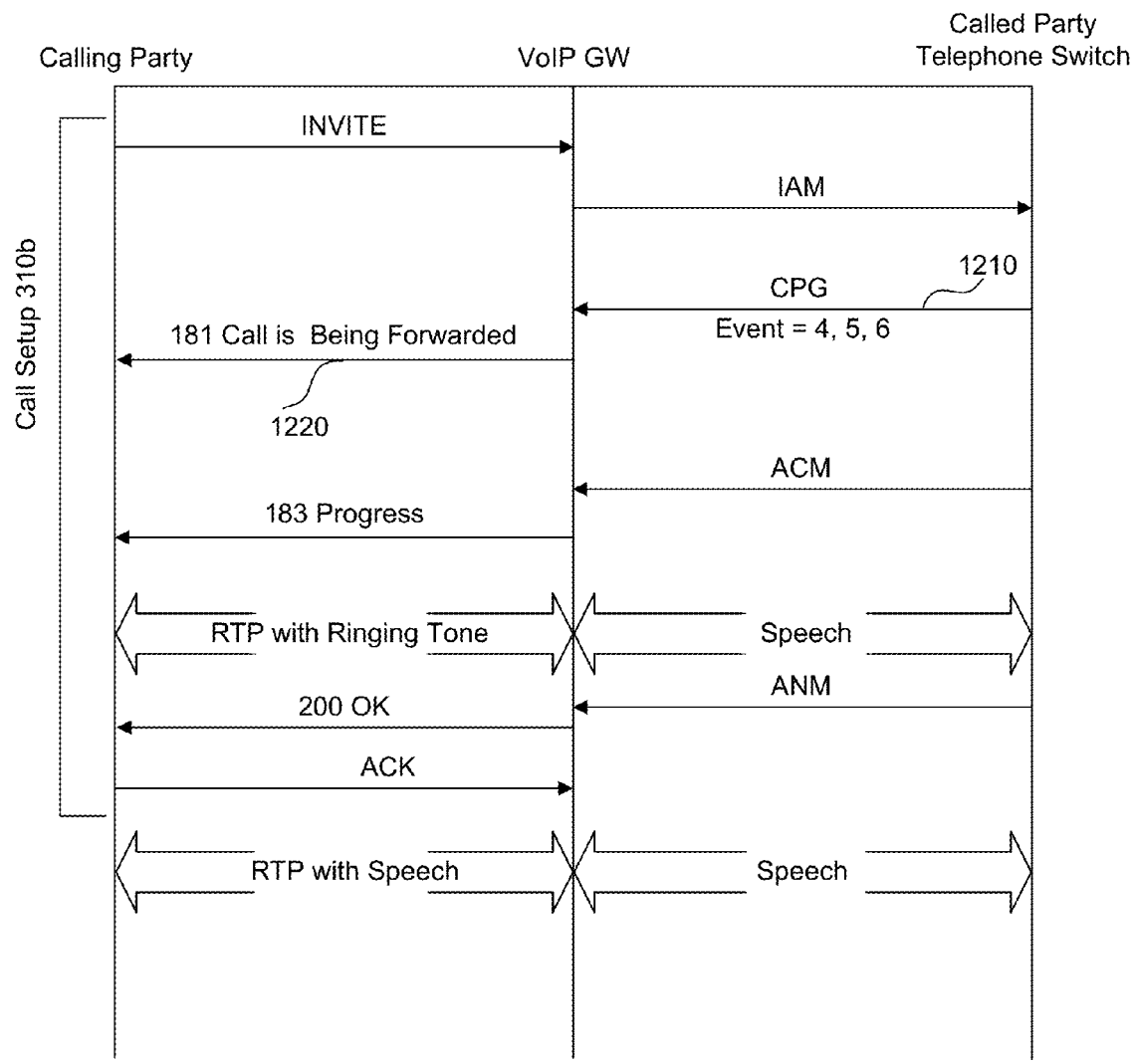
FIG. 12 illustrates a diagram of a signaling call flow for a call forwarding event initiated by a PSTN called party, according to exemplary embodiments of the present disclosure.
Figure 13:
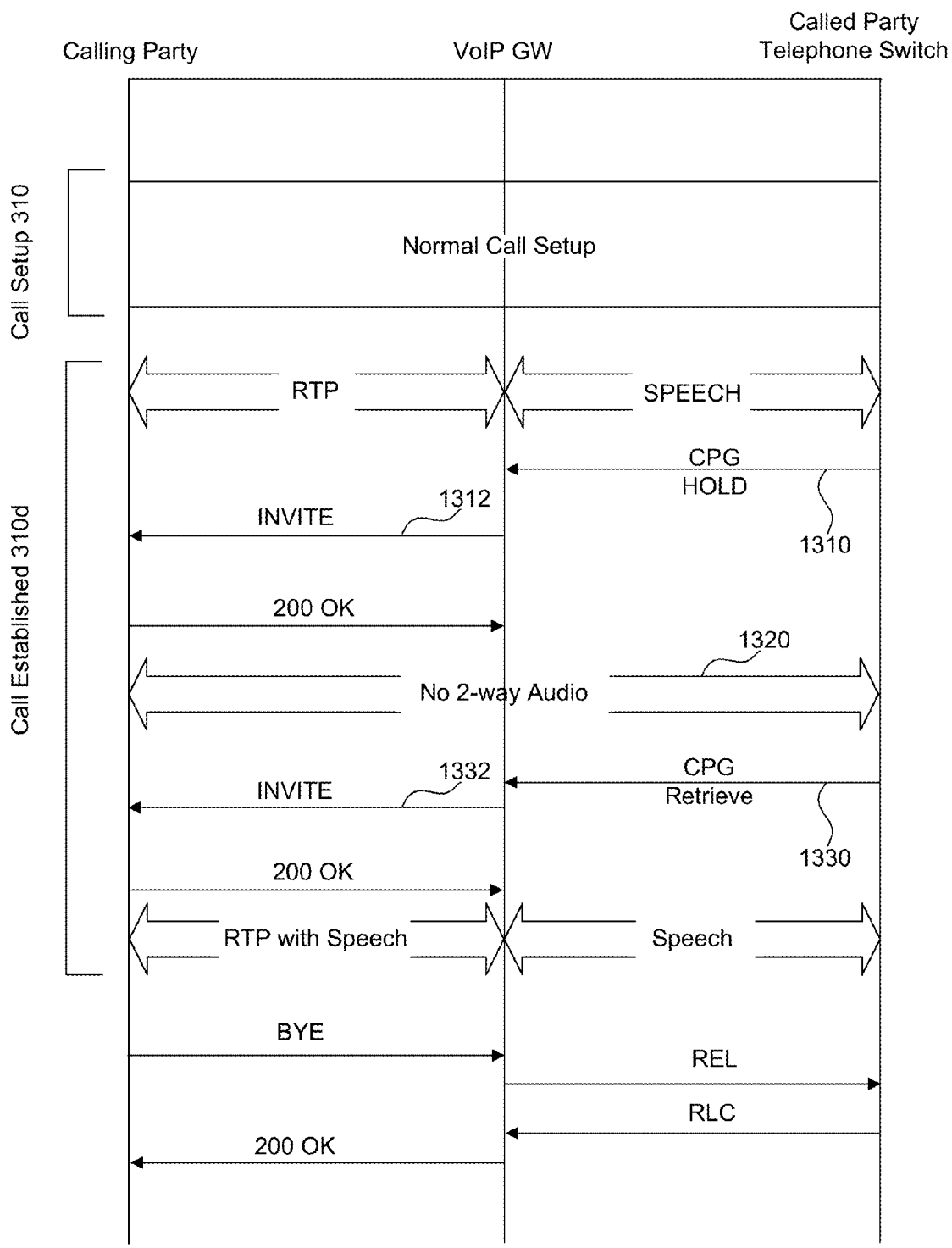
FIG. 13 illustrates a diagram of a signaling call flow for a call hold event initiated by a PSTN called party, according to exemplary embodiments of the present disclosure.

FIGS. 11-13 depict several call flow embodiments of infractions when the inmate calling party connects to an outside calling party through the VoIP gateway 210 rather than the SBC. As described above, the call processing system 200 may also be connected directly to a PSTN 182 through a VoIP gateway 210 in addition to being connected through the SBC 220 via WAN 184. As such, the VoIP gateway provides the translation between VoIP-compatible signaling (voice data and SIP) and PSTN-compatible signaling (e.g. ISDN and SS7 ISUP signaling). The signaling flows, therefore, are a mixture of SIP signaling within the prison communication center 200 and SS7 ISUP signaling outside of the prison. The VoIP gateway provides translation using the signaling gateway 212 that allows some or all of the SS7 messages and their contents to be translated into a SIP message. RFC 3398 provides a common mapping of ISUP messages to SIP messages. Several of the same detection flags from the VoIP-to-VoIP scenarios of FIG. 6-10 can be retained as a result of the translation, because the ISUP message sent to the M&D module 300 from the PSTN is translated into a SIP message for use with the VoIP network within the prison. These same messages can be used for infraction detection.

FIG. 11 depicts an embodiment of the signaling flow for a successfully established voice call with no infraction attempted by the called party. The inmate calling party initiates the call setup phase 310 by sending a SIP INVITE message to the VoIP Gateway. The VoIP gateway translates this message into an ISUP Initial Address Message (IAM), which is then routed to a telephone switch serving the called party by the PSTN. When the called party receives the IAM message, it sends back an Address Complete Message (ACM), which results in a SIP 183 Progress response message being sent from the VoIP gateway to the inmate calling party. Here, a voice data stream is opened between the VoIP gateway and the inmate calling party to play a ringtone that is then sent from the switch to the VoIP gateway. This is analogous to the SIP 180 Ringing response message being sent in the VoIP context (as seen in FIG. 4) that indicates that the called party terminal is "ringing" and awaiting the called party to accept the phone call. In the VoIP context, rather than an actual audible sound being played over a call session, the 180 Ringing message simply triggers a ringtone sound to be played in the calling party's terminal earpiece.

When the called party accepts the call, an Answer Message (ANM) is sent from the called party telephone switch, and this is translated into a 200 OK by the VoIP gateway and sent to the inmate calling party. The inmate calling party sends an ACK to the VoIP gateway to acknowledge receipt of the 200 OK message, and the call setup is complete. The call established phase and the call disconnection phase occur in much the same way as the VoIP-to-VoIP context of FIG. 4, with translation occurring at the VoIP gateway for both audio and several call disconnection related messages.

FIG. 12 depicts an embodiment of the signaling flow for a call forwarding event initiated by the called party. The INVITE and IAM messages of the initial call setup are immediately followed by an ISUP Call Progress Group (CPG) message 1210 sent from the called party switch that contains an "Event" code of 4, 5 or 6, which indicates that the call is being forwarded to another called party. This is translated directly into a SIP 181 Call is Being Forwarded response message 1220 in the VoIP gateway and sent to the inmate calling party. Importantly, this message is the same message used to detect a suspected infraction in step 510 of the operational flow of FIGS. 5A-5D, and can be used in this scenario to generate a "YES" output in 510. However, the confirmation of suspected infraction as disallowed in step 514 may require a step using voice recognition once the call is being forwarded, as the contact header information provided in subsequent SIP messages may not be as informative because the SIP messages are being translated from the ISUP signaling received. The remainder of the call setup is mostly maintained, as an ACM message, ringtone audio, and an ANM are received from the forwarded party to receive the call.

FIG. 13 depicts an embodiment of the signaling flow for a call hold event initiated by the called party. The call setup phase 310 occurs as depicted in FIG. 11, followed by the call established phase 320 establishment of 2-way audio via an RTP packet stream within the prison system and a circuit-switched stream between the VoIP GW and the called party telephone switch. During the call established phase, another ISUP CPG message 1310 arrives with a "HOLD" indicator, and this is translated directly into a SIP INVITE message 1312 with attribute line "a=sendonly" contained in the SDP information. The inmate calling party responds with a 200 OK message, and 2-way audio is stopped at 1320, wherein the inmate calling party stops sending RTP packets to the VoIP Gateway in accordance with the "a=sendonly" attribute line as described relative to FIG. 8.

When the called party wishes to resume the call with the inmate calling party, another ISUP CPG message 1330 is sent with a "Retrieve" indicator is sent by the called party switch, and the VoIP gateway translates this to a SIP INVITE message 1332 with an attribute line "a=sendrecv." This then resumes the 2-way audio stream at 1340 and the call can continue.

Similar to the call hold scenario of FIG. 8 involving VoIP-capable calling and called parties, the call hold scenario of FIG. 13 can be detected using almost identical techniques in steps 530, 532, and 534 of FIG. 5B. During the call established phase at step 526, the M&D module 300 can detect that abnormal signaling has been received by the VoIP gateway if a translation of an ISUP message results in an INVITE message during the call established phase. At this point, a "YES" output is achieved at step 530 and a log of the suspected infraction is logged into the administrative workstation and optionally to the JMS at step 532. At step 534, the SIP decoding and detection modules 360 and 362 read the INVITE message contents to determine if the attribute line "a=sendonly" or "a=inactive" is present, and if so, a "YES" output is achieved at step 534 and corrective action can be taken in accordance with the operational flow depicted in FIG. 5C. A log can be sent to the administrative workstation and optionally to the JMS in step 545 confirming that the INVITE represents a call hold event, and corrective action can be taken at step 550. As with the VoIP-to-VoIP context of FIG. 8, the call hold event is more ambiguous because there is no clear indicator of what third party is being added, or indeed if a third party is being added to the call at all. The corrective action can be adjusted to reflect this ambiguity. Thus, prison officials may decide to set a more lenient policy for detections of call hold in the administrative workstation.

Many of the peculiarities of the voice data packet flow seen in FIG. 8 are also retained in this scenario, as the RTP packet flow once again ceases as a result of the renegotiation of the call session with the "a=sendonly" attribute line in the INVITE message 1320. This can also be taken into account in steps 530, 532, and 534 to detect a potential infraction and confirmed infraction. Since one indicator of call hold is when the voice data packet flow from the inmate calling side ceases completely for a significant period of time, another rule that can be used in the abnormal activity detection module 530, enabled by the voice data decoding and voice data detection modules 370 and 372, can be the complete absence of packets received by the VoIP gateway from the inmate calling party.

Computer System

It will be apparent to persons skilled in the relevant art(s) that various modules and features of the present disclosure, as described herein, can be implemented in hardware using analog and/or digital circuits, in software, through the execution of computer instructions by one or more general purpose or special-purpose processors, or as a combination of hardware and software.

Embodiments of the present disclosure can be implemented in hardware, or as a combination of software and hardware. Consequently, embodiments of the disclosure may be implemented in the environment of a computer system or other processing system. For example, the call processing system 200 depicted in FIG. 2, the M&D module 300 depicted in FIG. 3B and its associated operational flow in FIG. 5A-5D, can be implemented in the environment of one or more computer systems or other processing systems. An example of such a computer system 1400 is shown in FIG. 4. One or more of the modules depicted in the previous figures, particularly the various modules of the call processing system 200 depicted in FIG. 2, can be at least partially implemented on one or more distinct computer systems 1400.

Figure 14:
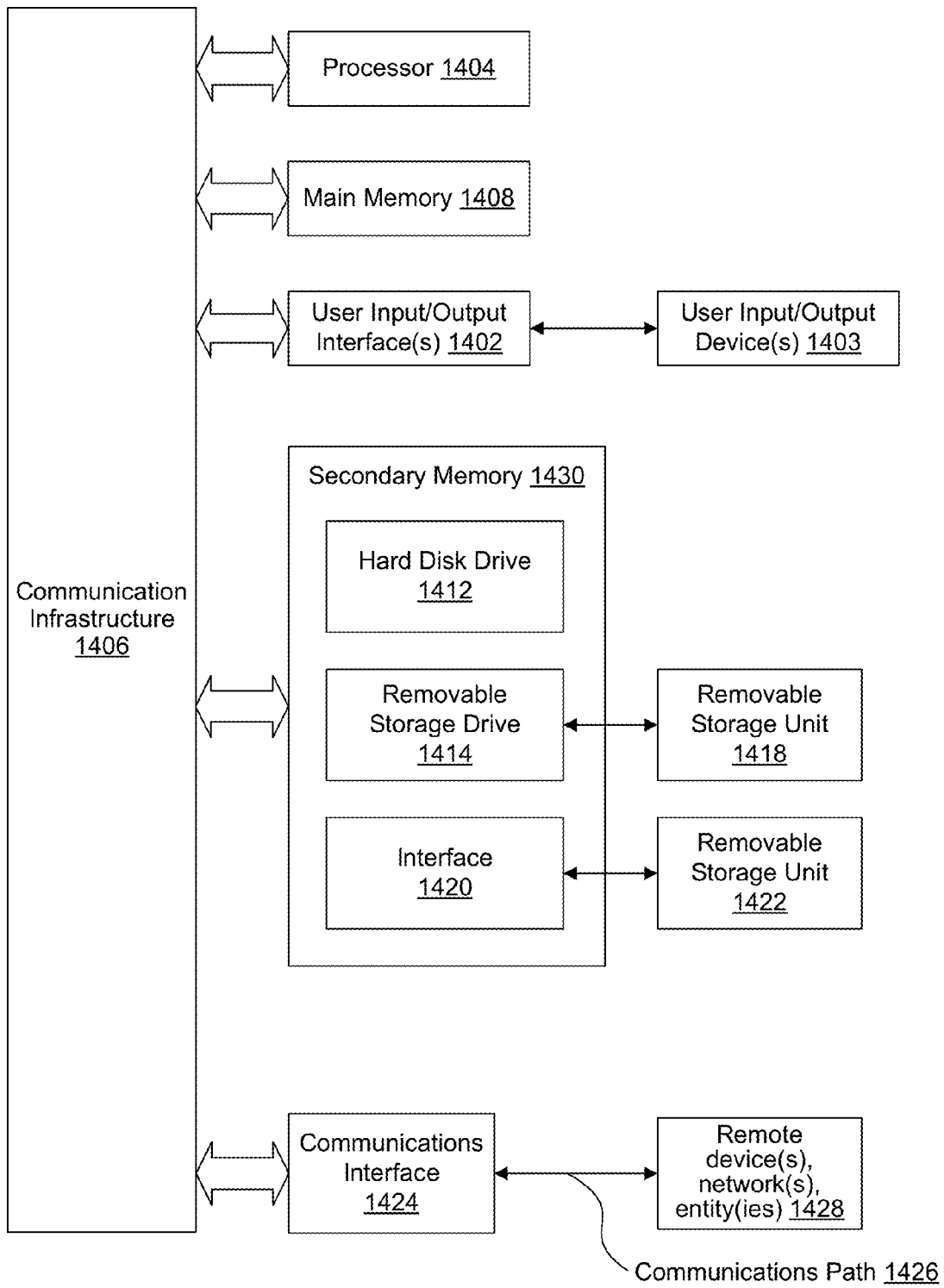
FIG. 14 illustrates a computer system, according to exemplary embodiments of the present disclosure.

FIG. 14 illustrates an exemplary embodiment of a computer system 1400 that can be used to implement the methods and apparatus of the present invention. Computer system 1400 includes one or more processors, such as processor 1404. Processor 1404 can be a special purpose or a general purpose digital signal processor. Processor 1404 is connected to a communication infrastructure 1406 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1400 also includes a main memory 1408, preferably random access memory (RAM), and may also include a secondary memory 1430. Secondary memory 1430 may include, for example, a hard disk drive 1412 and/or a removable storage drive 1414, representing a floppy disk drive, a magnetic tape drive, an optical disk drive, or the like. Removable storage drive 1414 reads from and/or writes to a removable storage unit 1418 in a well-known manner. Removable storage unit 1418 represents a floppy disk, magnetic tape, optical disk, or the like, which is read by and written to by removable storage drive 1414. As will be appreciated by persons skilled in the relevant art(s), removable storage unit 1418 includes a computer usable storage medium having stored therein computer software and/or data.

In alternative implementations, secondary memory 1430 may include other similar means for allowing computer programs or other instructions to be loaded into computer system 1400. Such means may include, for example, a removable storage unit 1422 and an interface 1420. Examples of such means may include a program cartridge and cartridge interface (such as that found in video game devices), a removable memory chip (such as an EPROM, or PROM) and associated socket, a thumb drive and USB port, and other removable storage units 1422 and interfaces 1420 which allow software and data to be transferred from removable storage unit 1422 to computer system 1400.

Computer system 1400 may also include a communications interface 1424. Communications interface 1424 allows software and data to be transferred between computer system 1400 and external devices. Examples of communications interface 1424 may include a modem, a network interface (such as an Ethernet card), a communications port, a PCMCIA slot and card, etc. Software and data transferred via communications interface 1424 are in the form of signals which may be electronic, electromagnetic, optical, or other signals capable of being received by communications interface 1424. These signals are provided to communications interface 1424 via a communications path 1426. Communications path 1426 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1418 and 1422 or a hard disk installed in hard disk drive 1410. These computer program products are means for providing software to computer system 1400.

Computer programs (also called computer control logic) are stored in main memory 1406 and/or secondary memory 1408. Computer programs may also be received via communications interface 1420. Such computer programs, when executed, enable the computer system 1400 to implement the present disclosure as discussed herein. In particular, the computer programs, when executed, enable processor 1404 to implement the processes of the present disclosure, such as any of the methods described herein. Accordingly, such computer programs represent controllers of the computer system 1400. Where the disclosure is implemented using software, the software may be stored in a computer program product and loaded into computer system 800 using removable storage drive 1414, interface 1420, or communications interface 1406.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

What is claimed is:

1. A method for detecting fraudulent activity in a communication system serving a correctional facility, comprising:
   receiving a packet stream associated with a voice call utilizing voice over internet protocol (VoIP) between an inmate call party and an outside call party, the packet stream including a session initiation protocol (SIP) message stream;
   determining a call phase of the voice call based on the packet stream, wherein the call phase is one of a call setup phase and a call established phase, the call established phase occurring after a successful end of the call setup phase;
   flagging a first SIP message from within the SIP message stream as requiring further investigation, wherein the determining that the first SIP message requires further investigation includes:
      determining, during the call setup phase, that a message type associated with the first SIP message is one of a 181 Response or a 3xx Response, wherein 3xx in the 3xx Response represents an integer between 300 and 399; or
      determining, during the call established phase, that the message type is one of an INVITE or a REFER; and
   in response to the flagging that the first SIP message requires further investigation, confirming that a disallowed third party has joined the voice call based at least in part on a first content of the first SIP message or a second content of a second SIP message, the second SIP message appearing after the first SIP message within the SIP message stream.

2. The method of claim 1, wherein the call established phase begins when a real-time transport protocol (RTP) packet stream appears within the packet stream.

3. The method of claim 1, wherein the message type is 181 Response and the second content comprises a header information field including a SIP universal resource identifier (SIP-URI), and wherein the confirming is based on the SIP-URI being on a block list for the inmate call party.

4. The method of claim 1, wherein the message type is 181 Response and the second content comprises a header information field including a telephone number, and wherein the confirming is based on the telephone number being on a block list for the inmate call party.

5. The method of claim 1, wherein the message type is 3xx Response and the first content comprises a header information field including a SIP universal resource identifier (SIP-URI), and wherein the confirming is based on the SIP-URI being on a block list for the inmate call party.

6. The method of claim 1, wherein the message type is 3xx Response and the first content comprises a header information field including a telephone number, and wherein the confirming is based on the telephone number being on a block list for the inmate call party.

7. The method of claim 1, wherein the message type is INVITE and the first content comprises a header information field, and wherein the confirming is based on the header information field containing an "isfocus" indication.

8. The method of claim 1, wherein the message type is INVITE and the first content comprises a session data protocol (SDP) information section, and wherein the confirming is based on the SDP information section including an "a=sendonly" indication or an "a=recvonly" indication.

9. The method of claim 1, further comprising detecting that a fraudulent activity has occurred based on an absence of real-time transport protocol (RTP) packets in the packet stream during the call established phase for a time longer than a pre-determined threshold.

10. The method of claim 1, further comprising detecting that a fraudulent activity has occurred based on a presence of silence insertion description (SID) packets in the packet stream during the call established phase for a time longer than a pre-determined threshold.

11. The method of claim 1, wherein the message type of the first SIP message is REFER and the first content includes a "refer-to" header information field including a SIP universal resource identifier (SIP-URI) or a telephone number, and wherein the confirming is based on the SIP-URI or the telephone number being on a block list for the inmate call party.

12. The method of claim 1, further comprising:
in response to the flagging that the first SIP message requires further investigation, sending a suspected infraction log to a jail management server; and
in response to the confirming:
sending a confirmed infraction log to the jail management server, the confirmed infraction log including an infraction type that is at least one of "call forwarding", "call hold", and "call forwarding"; and
triggering a corrective action.

13. A method for detecting fraudulent activity in a communication system in a correctional facility, comprising:
receiving a packet stream associated with a voice call utilizing voice over internet protocol (VoIP) between an inmate call party and an outside call party, the packet stream including a session initiation protocol (SIP) message stream;
determining a call phase of the voice call, wherein the call phase is one of a call setup phase and a call established phase, the call established phase occurring after a successful end of the call setup phase;
detecting that a message type associated with a first SIP message from the SIP message stream is one of a 181 Response or a 3xx Response during the call setup phase, or that the message type is one of an INVITE or a REFER during the call established phase, wherein 3xx in the 3xx Response represents an integer between 300 and 399;
flagging that the first SIP message requires further investigation based on the detecting; and
in response to the flagging that the first SIP message requires further investigation, confirming that a disallowed third party has joined the voice call based at least on a first content associated with the first SIP message or a second content associated with a second SIP message from the SIP message stream, the second SIP message appearing after the first SIP message within the SIP message stream.

14. The method of claim 13, wherein the call established phase begins when a real-time transport protocol (RTP) packet stream appears within the packet stream.

15. The method of claim 13, wherein the message type is 181 Response and the second content comprises a header information field including a SIP universal resource identifier (SIP-URI) or a telephone number, and wherein the confirming is based on the SIP-URI or the telephone number being on a block list for the inmate call party.

16. The method of claim 13, wherein the message type is 3xx Response and the first content comprises a header information field including a SIP universal resource identifier (SIP-URI) or a telephone number, and wherein the confirming is based on the SIP-URI or the telephone number being on a block list for the inmate call party.

17. The method of claim 13, wherein the message type is INVITE and the first content comprises a header information field, and wherein the confirming is based on the header information field containing an "isfocus" indication.

18. The method of claim 13, wherein the message type is INVITE and the first content comprises a session data protocol (SDP) information section, and wherein the confirming is based on the SDP information section including an "a=sendonly" indication or an "a=recvonly" indication.

19. A monitoring and detection system, comprising:
a memory that stores a block list for an inmate call party;
a network interface configured to receive a packet stream associated with a voice call utilizing voice over internet protocol (VoIP) between the inmate call party and an outside call party, the packet stream including a session initiation protocol (SIP) message stream; and
a processor, configured to:
determine a call phase of the voice call based on the SIP message stream, wherein the call phase is one of a call setup phase and a call established phase, the call established phase occurring after a successful end of the call setup phase;
flag a first SIP message from within the SIP message stream as requiring further investigation, wherein the flagging that the first SIP message requires further investigation includes:
determining, during the call setup phase, that a message type associated with the first SIP message is one of a 181 Response or a 3xx Response, wherein 3xx in the 3xx Response represents an integer between 300 and 399; or
determining, during the call established phase, that the message type is one of an INVITE or a REFER; and
in response to the flagging that the first SIP message requires further investigation, confirm that a disallowed third party has joined the voice call based at least in part on a first content of the first SIP message or a second content of a second SIP message, the second SIP message appearing after the first SIP message within the SIP message stream.

20. The system of claim 19, wherein the message type is 181 Response and the second content comprises a header information field including a SIP universal resource identifier (SIP-URI) or a telephone number, and wherein the confirming is based on the SIP-URI or the telephone number being on the block list for the inmate call party.

21. The system of claim 19, wherein the message type is 3xx Response and the first content comprises a header information field including a SIP universal resource identifier (SIP-URI) or a telephone number, and wherein the confirming is based on the SIP-URI or the telephone number being on the block list for the inmate call party.

22. The system of claim 19, wherein the message type is INVITE and the first content comprises a header information field, and wherein the confirming is based on the header information field containing an "isfocus" indication.

23. The system of claim 19, wherein the message type is INVITE and the first content comprises a session data protocol (SDP) information section, and wherein the confirming is based on the SDP information section including an "a=sendonly" indication or an "a=recvonly" indication.

24. The system of claim 19, wherein the processor is further configured to detect that a fraudulent activity has occurred based on an absence of real-time transport protocol (RTP) packets in the packet stream during the call established phase for a time longer than a pre-determined threshold.

25. The system of claim 19, wherein the processor is further configured to detect that a fraudulent activity has occurred based on a presence of silence insertion description (SID) packets in the packet stream during the call established phase for a time longer than a pre-determined threshold.

26. A monitoring and detection system, comprising:
a memory that stores a block list for an inmate call party;
a network interface configured to receive a packet stream associated with a voice call utilizing voice over internet protocol (VoIP) between the inmate call party and an outside call party, the packet stream including a session initiation protocol (SIP) message stream; and
a processor, coupled to the network interface, configured to:
determine a call phase of the voice call, wherein the call phase is one of a call setup phase and a call established phase, the call established phase occurring after a successful end of the call setup phase;
detect that a message type associated with a first SIP message from the SIP message stream is one of a 181 Response or a 3xx Response during the call setup phase or that the message type is one of an INVITE or a REFER during the call established phase, wherein 3xx in the 3xx Response represents an integer between 300 and 399;
flag the first SIP message as requiring further investigation based on the detecting; and
in response to the flagging that the first SIP message requires further investigation, confirm that a disallowed third party has joined the voice call based at least on a first content associated with the first SIP message or a second content associated with a second SIP message from the SIP message stream, the second SIP message appearing after the first SIP message within the SIP message stream.

27. The system of claim 26, wherein the message type is 181 Response and the second content comprises a header information field including a SIP universal resource identifier (SIP-URI) or a telephone number, and wherein the confirming is based on the SIP-URI or the telephone number being on the block list for the inmate call party.

28. The system of claim 26, wherein the message type is 3xx Response and the first content comprises a header information field including a SIP universal resource identifier (SIP-URI) or a telephone number, and wherein the confirming is based on the SIP-URI or the telephone number being on the block list for the inmate call party.

29. The system of claim 26, wherein the message type is INVITE and the first content comprises a header information field, and wherein the confirming is based on the header information field containing an "isfocus" indication.

30. The system of claim 26, wherein the message type is INVITE and the first content comprises a session data protocol (SDP) information section, and wherein the confirming is based on the SDP information section including an "a=sendonly" indication or an "a=recvonly" indication.

* * * * *